United States Patent
Ishida et al.

(10) Patent No.: US 11,156,196 B2
(45) Date of Patent: Oct. 26, 2021

(54) STARTING DEVICE, ROTATING ELECTRICAL MACHINE, AND STARTING ELECTRIC MOTOR UNIT

(71) Applicants: DENSO CORPORATION, Kariya (JP); TOYOTA JIDOSHA KABUSHIKI KAISHA, Toyota (JP)

(72) Inventors: Minoru Ishida, Kariya (JP); Minoru Okamiya, Kariya (JP); Takayuki Kogure, Toyota (JP); Hiroshi Enomoto, Nissin (JP); Takahisa Miura, Nagoya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/559,068

(22) Filed: Sep. 3, 2019

(65) Prior Publication Data

US 2019/0390640 A1 Dec. 26, 2019

Related U.S. Application Data

(63) Continuation of application No. PCT/JP2018/008137, filed on Mar. 2, 2018.

(30) Foreign Application Priority Data

Mar. 2, 2017 (JP) .............................. JP2017-039842

(51) Int. Cl.
*F02N 11/08* (2006.01)
*H02P 9/04* (2006.01)
(Continued)

(52) U.S. Cl.
CPC .......... *F02N 11/06* (2013.01); *F02N 11/0851* (2013.01); *F02N 11/0862* (2013.01);
(Continued)

(58) Field of Classification Search
CPC .. F02N 11/06; F02N 11/0851; F02N 11/0862; F02N 2011/0896; H02K 7/075; H02K 7/116; H02K 7/1815; H02K 7/20
See application file for complete search history.

(56) References Cited

U.S. PATENT DOCUMENTS 9,133,810 B2 * 9/2015 Kees ...................... F02N 11/006
9,593,658 B2 * 3/2017 Proebstle ............ F02N 11/0866
(Continued)

FOREIGN PATENT DOCUMENTS

| JP | 4232069 B2 | 3/2009 |
| JP | 2013-193551 A | 9/2013 |

(Continued)

*Primary Examiner* — Tulsidas C Patel
*Assistant Examiner* — Thomas K Quigley
(74) *Attorney, Agent, or Firm* — Oliff PLC

(57) ABSTRACT

A starting device is used in a starting system that includes a starting electric motor unit and a rotating electrical machine; the starting electric motor unit including a motor that rotates a pinion gear, and a pushing member that pushes out the pinion gear toward a ring gear, the ring gear rotating together with a crankshaft of an engine; the rotating electrical machine being connected to the crankshaft and rotating the crankshaft; the starting system being configured to push, using the pushing member, the pinion gear toward the ring gear, and drive the motor to rotate, based on driving force of the motor, the ring gear via the pinion gear, thus starting the engine. The starting device includes a drive instruction unit that instructs the rotating electrical machine to rotate the ring gear via the crankshaft during a pre-drive period before drive of the motor.

9 Claims, 12 Drawing Sheets

(51) Int. Cl.
    *F02N 11/06*    (2006.01)
    *H02K 7/075*    (2006.01)
    *H02K 7/116*    (2006.01)
    *H02K 7/18*     (2006.01)
    *H02K 7/20*     (2006.01)

(52) U.S. Cl.
    CPC ............ *H02K 7/075* (2013.01); *H02K 7/116* (2013.01); *H02K 7/1815* (2013.01); *H02K 7/20* (2013.01); *F02N 2011/0896* (2013.01)

(56) References Cited

U.S. PATENT DOCUMENTS

| | | | | |
|---|---|---|---|---|
| 9,599,088 | B2* | 3/2017 | Aoyagi | F02N 15/02 |
| 9,982,647 | B2* | 5/2018 | Imura | F02N 11/0844 |
| 10,259,448 | B2* | 4/2019 | Bucknor | F02N 11/0862 |
| 10,408,184 | B1* | 9/2019 | Namuduri | F02N 11/0844 |
| 10,533,528 | B2* | 1/2020 | Yamamoto | B60K 6/48 |
| 2002/0070555 | A1* | 6/2002 | Osada | F02N 11/0866 |
| | | | | 290/31 |
| 2003/0230271 | A1* | 12/2003 | Maruhashi | F02N 11/0851 |
| | | | | 123/179.3 |
| 2009/0050384 | A1* | 2/2009 | Muller | B60L 50/61 |
| | | | | 180/65.21 |
| 2009/0267553 | A1* | 10/2009 | Labbe | H01H 51/065 |
| | | | | 318/430 |
| 2010/0041503 | A1* | 2/2010 | Borntraeger | B60K 6/40 |
| | | | | 475/5 |
| 2010/0256896 | A1* | 10/2010 | Kitano | F02N 11/0855 |
| | | | | 701/113 |
| 2010/0299053 | A1* | 11/2010 | Okumoto | F02N 11/0855 |
| | | | | 701/113 |
| 2010/0305838 | A1* | 12/2010 | Yamamura | F02D 41/062 |
| | | | | 701/113 |
| 2011/0056450 | A1* | 3/2011 | Notani | F02N 11/0855 |
| | | | | 123/179.4 |
| 2011/0184626 | A1* | 7/2011 | Mauritz | F02N 11/0855 |
| | | | | 701/102 |
| 2012/0260878 | A1* | 10/2012 | Kitano | F02N 11/0855 |
| | | | | 123/179.3 |
| 2013/0104830 | A1* | 5/2013 | Moriya | F02N 11/0851 |
| | | | | 123/179.4 |
| 2013/0133605 | A1* | 5/2013 | Neet | F02N 11/08 |
| | | | | 123/179.3 |
| 2013/0135065 | A1* | 5/2013 | Neet | F02N 11/0814 |
| | | | | 335/72 |
| 2013/0221683 | A1* | 8/2013 | Bradfield | F02N 11/0851 |
| | | | | 290/38 R |
| 2013/0237360 | A1* | 9/2013 | DeLucia | B60K 6/52 |
| | | | | 475/5 |
| 2013/0269645 | A1* | 10/2013 | Proebstle | F02N 11/0866 |
| | | | | 123/179.25 |
| 2013/0319360 | A1* | 12/2013 | Aoyagi | F02N 11/106 |
| | | | | 123/179.3 |
| 2014/0166378 | A1* | 6/2014 | Mair | B60K 17/046 |
| | | | | 180/65.6 |
| 2014/0191513 | A1* | 7/2014 | Kees | F02N 11/006 |
| | | | | 290/38 R |
| 2014/0210216 | A1* | 7/2014 | Konishi | B60W 20/00 |
| | | | | 290/38 R |
| 2015/0226171 | A1* | 8/2015 | Kees | B60W 30/194 |
| | | | | 290/31 |
| 2015/0258881 | A1* | 9/2015 | Holmes | B60L 15/2072 |
| | | | | 477/3 |
| 2016/0115934 | A1* | 4/2016 | Neet | F02N 11/0803 |
| | | | | 74/6 |
| 2016/0153419 | A1* | 6/2016 | Minegishi | B60W 20/50 |
| | | | | 290/38 C |
| 2017/0204828 | A1* | 7/2017 | Imura | F02N 11/0855 |
| 2017/0254310 | A1* | 9/2017 | Nakaoka | F02N 11/101 |
| 2018/0050686 | A1* | 2/2018 | Atluri | B60W 20/40 |
| 2018/0135583 | A1 | 5/2018 | Mizuno et al. | |

FOREIGN PATENT DOCUMENTS

| | | |
|---|---|---|
| JP | 2016-211381 A | 12/2016 |
| JP | 2017-089508 A | 5/2017 |

* cited by examiner

STARTING DEVICE, ROTATING ELECTRICAL MACHINE, AND STARTING ELECTRIC MOTOR UNIT

CROSS REFERENCE TO RELATED APPLICATION

The present application is a continuation application of International Application No. PCT/JP2018/008137, filed on Mar. 2, 2018, which claims priority to Japanese Patent Application No. 2017-039842 filed on Mar. 2, 2017. The contents of these applications are incorporated herein by reference in their entirety.

BACKGROUND

Technical Field

The present disclosure relates to a starting device for starting an engine, a rotating electrical machine, and a starting electric motor unit.

Background Art

As a starting device for starting an engine (internal combustion engine), a starter is known that starts an engine by the following process: a pinion gear is pushed out toward a ring gear by a pushing member of the starter and the teeth of the pinion gear are accommodated in spaces between teeth formed on the ring gear of the engine, to engage the pinion gear with the ring gear, and the pinion gear is rotated by the driving force of a starter motor.

SUMMARY

In the present disclosure, a starting device used in a starting system that includes a starting electric motor unit and a rotating electrical machine, the starting electric motor unit including a motor that rotates a pinion gear, and a pushing member that pushes out the pinion gear toward a ring gear, the ring gear rotating together with a crankshaft of an engine, the rotating electrical machine being connected to the crankshaft and rotating the crankshaft, wherein the starting device includes a drive instruction unit that instructs the rotating electrical machine to rotate the ring gear via the crankshaft during a pre-drive period before drive of the motor.

BRIEF DESCRIPTION OF THE DRAWINGS

The object described above and other objects, features and advantages according to the present disclosure will become more apparent from the following detailed description with reference to the attached drawings.

DETAILED DESCRIPTION OF THE PREFERRED EMBODIMENTS

Figure 1:
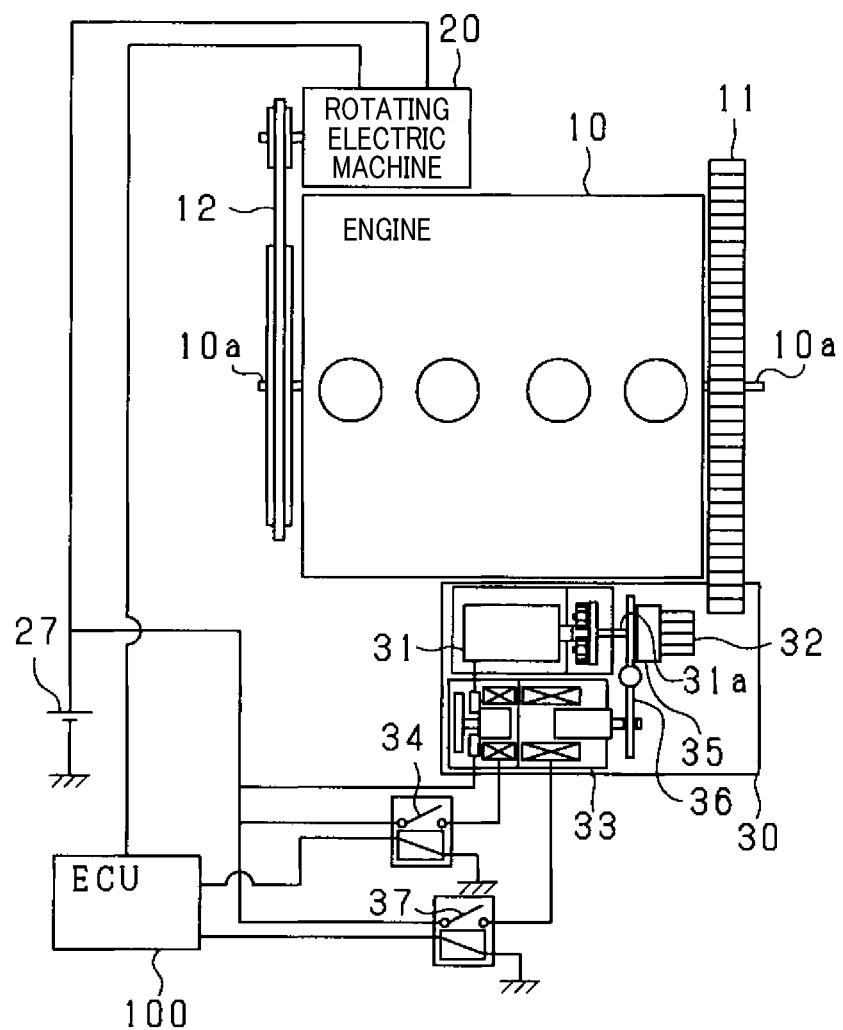
FIG. 1 illustrates the overall configuration of a starting system.

Incidentally, in the starter serving as a starting device for starting an engine (internal combustion engine), in the situation where the pushing member simply pushes out the pinion gear to the ring gear side, there are cases where the teeth of the pinion gear are not accommodated in the space between teeth of the ring gear due to the end surface of the pinion gear simply coming in contact with the end surface of the ring gear, in other words, there are cases where the pinion gear and the ring gear do not engage. Therefore, in the case of the starter described in Patent Literature 1, when starting the engine, a preliminary process is performed in which after the pinion gear is pushed out, the starter motor rotates the pinion gear by just an angle corresponding to one pitch. As a result, when the starter motor rotates the pinion gear in order to start the engine, it becomes easy for the ring gear and the pinion gear to already be in an engaged state. Therefore, when the starter motor rotates the pinion gear in order to the start the engine, the pinion gear and the ring gear are in an engaged state and the pinion gear begins to rotate with the teeth of the pinion gear inside the space between teeth of the ring gear, so impact between teeth surfaces at this time may be reduced.

[PLT 1] JP 4,232,069

However, at the start of driving of the starter motor, the starter motor exhibits a larger driving torque than usual due to inrush current. Therefore, even in a case of rotating by an angle corresponding to one pitch, the pinion gear can be sufficiently accelerated. Therefore, when the pinion gear and the ring gear engage and collide in a preliminary process, the difference in the rotational speed between the pinion gear and the ring gear may become large, and there is a possibility that the collision noise will become large.

Taking the situation described above into consideration, a main object of the technique according to the present disclosure is to provide a starting device, a rotating electrical machine, and a starting electric motor unit capable of suitably suppressing collision noise between the pinion gear and the ring gear.

In order to solve the problem described above, a first aspect can be summarized as a starting device used in a starting system that includes a starting electric motor unit and a rotating electrical machine, the starting electric motor unit including a motor that rotates a pinion gear, and a pushing member that pushes out the pinion gear toward a ring gear, the ring gear rotating together with a crankshaft of an engine, the rotating electrical machine being connected to the crankshaft and rotating the crankshaft, the starting system being configured to push, using the pushing member, the pinion gear toward the ring gear, and drive the motor to rotate, based on driving force of the motor, the ring gear via the pinion gear, thus starting the engine; wherein the starting device includes a drive instruction unit that instructs the rotating electrical machine to rotate the ring gear via the crankshaft during a pre-drive period before drive of the motor.

As a result, collision noise can be reduced by rotating the ring gear and causing the ring gear to engage with the pushed-out pinion gear according to a instruction from the drive instruction unit to the rotating electrical machine without rotating the pinion gear by the motor. Note that, in this specification, the term "rotational angular acceleration" refers to circumferential acceleration that occurs with rotation. In other words, refers to the value of the product of the radius of the gear and the respective angular acceleration.

A second aspect can be summarized as that the rotating electrical machine includes a multi-phase AC motor, and the drive instruction unit causes the ring gear to rotate by causing a current of a predetermined phase to flow in the multi-phase AC motor during the pre-drive period.

By causing a current of a predetermined phase to flow in the multi-phase AC motor, it is possible to drive the rotating electrical machine so as to make the rotational angular acceleration of the ring gear smaller than the rotational angular acceleration of the pinion gear based on driving by the motor. Moreover, even when the rotation angle of the crankshaft or the ring gear is not measured, the ring gear can be rotated within a predetermined range by supplying a current of a predetermined phase. Therefore, it is possible to suppress collision noise based on rotating the ring gear while suitably engaging the ring gear and the pinion gear.

A third aspect can be summarized as that the drive instruction unit causes a current of a phase different from the predetermined phase to flow, after causing a current of a predetermined phase to flow during the pre-drive period.

Depending on the positional relationship between the rotor and the stator in the state before energization, the ring gear may not rotate in some cases even when current of a predetermined phase is supplied. Therefore, after a current of a predetermined phase flows, a current of a phase different from the predetermined phase flows. As a result, the ring gear can be reliably rotated.

A fourth aspect can be summarized as that the multi-phase AC motor includes a field winding, and the drive instruction unit energizes the field winding after causing the current of the predetermined phase to flow during the pre-drive period.

Even in a case where the field winding is energized, it takes time to become excited. Therefore, compared with a case where a current of a predetermined phase is supplied after the field winding is excited, the torque is lower when the field winding is energized after supplying a current of a predetermined phase, and the rotational angular acceleration of the ring gear can be made smaller. Accordingly, in a case where the ring gear is rotated based on driving by the rotating electrical machine, even when the ring gear and the pinion gear collide, collision noise can be suppressed.

A fifth aspect can be summarized as that the starting electric motor unit includes a connecting mechanism that is connected to the pinion gear, and cuts off power from the ring gear to the motor when the ring gear rotates in a predetermined direction based on the rotation of the crankshaft, and the drive instruction unit rotates the ring gear in the predetermined direction after causing the current of the predetermined phase to flow during the pre-drive period.

The starting electric motor unit includes a connecting mechanism for cutting off power from the ring gear to the motor. Therefore, for example, even when the pinion gear and the ring gear collide with each other by rotating the ring gear in a predetermined direction, the transmission of the impact force to the motor can be prevented, and the durability can be improved. In addition, reliable engagement is possible.

A sixth aspect can be summarized as that the predetermined direction is a direction in which the ring gear is rotated by the pinion gear for starting the engine, and the starting device includes a motor driving unit for driving the motor; wherein the motor driving unit drives the motor to rotate the pinion gear in the same direction as the ring gear, as the ring gear starts to be rotated in the predetermined direction by the drive of the rotating electrical machine.

The rotating electrical machine rotates the ring gear in a predetermined direction after supplying a current of a predetermined phase so that the ring gear and the pinion gear engage with each other. When the ring gear rotates in a predetermined direction, the motor driving unit drives the motor to rotate the pinion gear in the same direction as the ring gear. Therefore, a difference in speed between the rotational speed of the pinion gear based on the drive of the motor and the rotational speed of the ring gear based on the drive of the rotating electrical machine can be reduced. In other words, even when collision occurs, collision noise can be suppressed.

A seventh aspect can be summarized as that the drive instruction unit causes the ring gear to rotate in a direction opposite the predetermined direction of rotation of the ring gear by the pinion gear after causing the current of the predetermined phase to flow during the pre-drive period.

The ring gear is rotated based on the drive of the rotating electrical machine in a direction opposite to the direction in which the ring gear is rotated by the pinion gear, so the pinion gear and the ring gear can be deep engaged. Then, by causing the pinion gear and the ring gear to engage deep before the motor drives, the area of the engagement surface of the pinion gear and the ring gear can be increased. Therefore, the durability of the pinion gear and the ring gear can be improved.

An eighth aspect can be summarized as that the rotating electrical machine rotates, during the pre-drive period before drive of the motor, the ring gear according to an instruction from the drive instruction unit after the pushing member pushes the pinion gear.

The drive instruction unit causes the pinion gear to be pushed out toward the stationary ring gear, so the collision noise at the time of contact can be further reduced.

First Embodiment

Hereinafter, embodiments according to the present disclosure will be described based on the drawings. Note that in each of the following embodiments, the same reference numbers as in the drawings will be given to parts that are the same or equivalent to each other. As illustrated in FIG. 1, a vehicle includes an engine 10, a rotating electrical machine 20, a starter 30 as a starting electric motor unit, and an ECU 100 as a starting device. The starting system of this embodiment includes at least the rotating electrical machine 20 and the starter 30. The engine 10 includes a crank shaft 10*a* and a ring gear 11 that rotates together with the crank shaft 10*a*.

<Rotating Electrical Machine 20>

Figure 2:
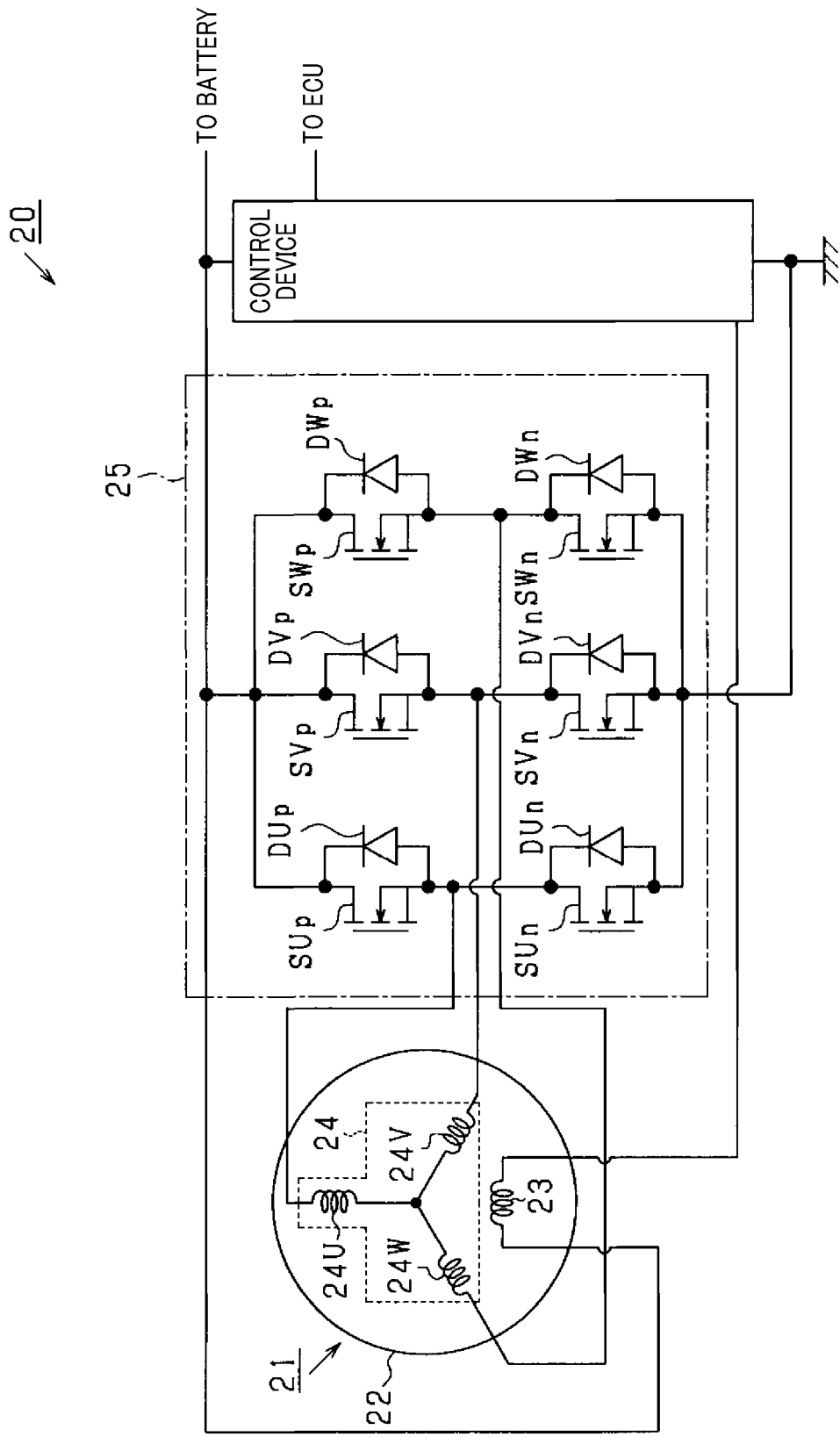
FIG. 2 illustrates the configuration of a rotating electrical machine.

As illustrated in FIG. 2, the rotating electrical machine 20 is an generator with a motor function having a three-phase AC motor (hereinafter, simply referred to as an AC motor 21) as a multi-phase AC motor, and an inverter 25 as an power converting device, and is configured as a electromechanical integrated type of Integrated Starter Generator (ISG). The AC motor 21 is a field-winding type motor, and more specifically, is a field-winding synchronous machine having three-phase winding. The rotating electrical machine 20 has a power generating function of performing generation (regenerative power generation) by rotation of a crankshaft 10a of the engine 10 or an axle, and a power running function of applying a driving force (rotational force) to the crankshaft 10a.

The rotor 22 constituting the AC motor 21 includes a field winding 23. In addition, the AC motor 21 is able to transmit power with the crankshaft 10a of the engine 10. In this embodiment, the rotor 22 is mechanically connected to the crankshaft 10a via a belt 12. A U-phase winding 24U, a V-phase winding 24V and a W-phase winding 24W are wound around the stator 24 constituting the AC motor 21 as an armature winding.

The inverter 25 electrically connects the AC motor 21, and the battery 27 which is the DC power supply of the vehicle. The inverter 25 includes three sets of series circuits respectively constituted by a U-phase upper arm switch SUp and a U-phase lower arm switch SUn, V-phase upper arm switch SVp and a U-phase lower arm switch SVn, and W-phase upper arm switch SWp and a W-phase lower arm switch SWn. A first end of the U-phase winding 24U is connected to a connection point between the U-phase upper and lower arm switches SUp and SUn. A first end of the V-phase winding 24V is connected to a connection point between the V-phase upper and lower arm switches SVp and SVn. A first end of the W-phase winding 24W is connected to a connection point between the W-phase upper and lower arm switches SWp and SWn. The second ends of the U-phase winding 24U, the V-phase winding 24V, and the W-phase winding 24W are connected at a neutral point.

In the present embodiment, N-channel MOSFETs are used as respective switches SUp to SWn. Then, respective diodes DUp to DWn are connected in reverse parallel to respective switches SUp to SWn. Incidentally, respective diodes DUp to DWn may be intrinsic diodes of respective switches SUp to SWn. Moreover, respective switches SUp to SWn are not limited to N-channel MOSFETs, and may be, for example, IGBTs.

The positive terminal of the battery 27 is connected to the drain, which is the high potential side terminal of each of the upper arm switches SUp to SWp. The source, which is the low potential side terminal of each of the lower arm switches SUn to SWn, is connected to the GND terminal (is grounded).

The rotating electrical machine 20 includes a control device 26. A DC voltage can be applied to the field winding 23 by the control device 26. The control device 26 controls the field current flowing through the field winding 23 by adjusting the DC voltage applied to the field winding 23. In addition, the control device 26, by controlling each of the switches SUp to SWn, controls each of the phase windings 24U to 24W to be energized, and the direction of the current (in other words, the phase of the current).

<Starter 30>

The starter 30 is used for starting the engine 10. As illustrated in FIG. 1, the starter 30 includes a motor 31 having an output shaft 31a, a pinion gear 32 attached so as to be movable in the axial direction of the output shaft 31a, and a pushing member 33 that pushes out the pinion gear 32 in the axial direction toward the ring gear 11 side (right side in FIG. 1).

The motor 31 rotates the output shaft 31a when power is supplied. Power is supplied to the motor 31 when the motor switch 34 is closed (turned ON). The pinion gear 32 is attached to the output shaft 31a of the motor 31 via an overrunning clutch 35 (hereinafter, simply referred to as a clutch 35) as a connecting mechanism.

The clutch 35 is configured so that when the rotational speed of the engine 10 (in other words, the rotational speed of the ring gear 11) becomes less than the rotational speed of the motor 31 (in other words, the rotational speed of the pinion gear 32), for example, before the engine 10 starts, the clutch 35 transmits the torque of the output shaft 31a based on the motor 31 to the pinion gear 32 side. On the other hand, the clutch 35 is configured so that when the rotational speed of the engine 10 exceeds the rotational speed of the motor 31, for example, after the engine 10 starts, the clutch 35 idles and does not directly transmit the driving force of the engine 10 to the motor 31 side.

The pushing member 33 has a pushing mechanism 36 that pushes out the pinion gear 32 toward the ring gear 11 side when power is supplied. Power is supplied to the pushing member 33 when the pushing switch 37 is closed (turned ON).

<ECU 100>

The ECU 100 includes a CPU and a memory as a storage unit, and by the CPU executing programs stored in the memory, the various functions of the ECU 100 are realized. Incidentally, the various functions may be realized by an electronic circuit, which is hardware, or at least some of the functions may be realized by software, i.e. processing executed on a computer.

As the various functions of the ECU 100 there are, for example, a function for controlling the generated voltage of the rotating electrical machine 20, and a function for controlling the torque of the rotating electrical machine 20 or the like. More specifically, the ECU 100 has a function that the control device 26 of the rotating electrical machine 20 controls energization of the field winding 23 and turning ON/OFF the switches SUp to SWn, or the like, based on an instruction from the ECU 100.

In addition, the ECU 100, for example, has a function for controlling the starter 30 so as to start the engine 10 when the starting condition of the engine 10 is satisfied. More specifically, when the ignition switch is turned ON, the ECU 100 outputs an operation signal for closing the pushing switch 37 to the pushing member 33 in order to push out the pinion gear 32 toward the ring gear 11 side. Then, after the pushing member 33 pushed out the pinion gear 32, the ECU 100 outputs an operation signal for closing the motor switch 34. As a result, power is supplied to the motor 31 and the driving force of the motor 31 is transmitted to the pinion gear 32 via the output shaft 31a and the clutch 35. The rotation of the pinion gear 32 causes the ring gear 11 to rotate, which causes the crankshaft 10a to rotate. As a result, the engine 10 starts.

Figure 3A:
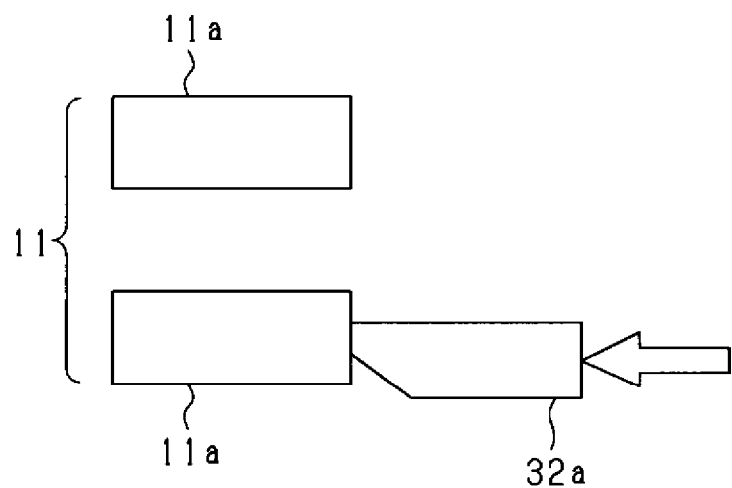
FIG. 3A and FIG. 3B are schematic diagrams of a pinion gear and a ring gear.
Figure 3B:
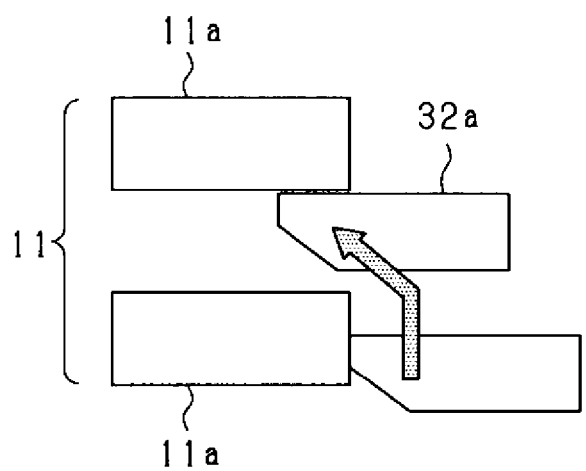

Incidentally, even though the pinion gear 32 is pushed out toward the ring gear 11 side by the pushing member 33, the ring gear 11 and the pinion gear 32 do not necessarily engage. For example, as illustrated in FIG. 3A, there is a possibility that side surfaces of the gear teeth 11a of the ring gear 11 and the gear teeth 32a of the pinion gear 32 will collide with each other. When the motor 31 is driven in this state, as illustrated in FIG. 3B, the pinion gear 32 rotates with respect to the ring gear 11, and as a result the ring gear 11 and the pinion gear 32 engage.

However, when the ring gear 11 and the pinion gear 32 engage, the surfaces of the teeth of the gears 11, 32 collide with each other and generate collision noise. Particularly, the starting torque of the motor 31 is generally determined in advance for the convenience of rotating the ring gear 11 in order to start the engine 10, and suppressing the collision noise by reducing the starting torque of the motor 31 is difficult.

Therefore, after pushing out the pinion gear 32 by the pushing member 33, and before driving the motor 31, the ring gear 11 is slightly rotated based on the driving of the rotating electrical machine 20 causing the gears 11, 32 to engage, whereby collision noise is suppressed. This is described in detail below.

In this embodiment, after the pushing member 33 pushes out the pinion gear 32, and in a pre-drive period before the motor 31 drives, the ECU 100 instructs the rotating electrical machine 20 to rotate the ring gear 11 via the crankshaft 10a. Then, in that pre-drive period, the ECU 100 drives the rotating electrical machine 20 so that the rotational angular acceleration of ring gear 11 is lower than the rotational angular acceleration of the pinion gear 32 based on the motor 31 drive. As a result, in this embodiment, the ECU 100 has a function as a drive instruction unit, and the ECU 100 has a configuration for driving the rotating electrical machine 20 so as to reduce the rotational angular acceleration of the ring gear 11.

In this embodiment, in the pre-drive period the ECU 100 controls the starting torque of the rotating electrical machine 20 so as that the rotational angular acceleration of the ring gear 11 is lower than the rotational angular acceleration of the pinion gear 32 based on the motor 31 drive. Note that the rotational angular acceleration can be calculated from the inertia of each axis, gear ratio, pulley ratio, starting torque, and the like.

Even when the ECU 100, serving as a drive instruction unit, instructs the rotating electrical machine 20 to rotate the ring gear 11 via the crankshaft 10a, the inertia of the engine 10, the crankshaft 10a, the ring gear 11, and the belt 12 which are the drive targets of the rotating electrical machine 20 is large, so it is easy for the rotational angular acceleration of the ring gear 11 to be less than the rotational angular acceleration of the pinion gear 32 when energizing and driving the motor 31, with respect to the output torque of the rotating electrical machine 20.

As a result, in the state before the ring gear 11 and the pinion gear 32 engage (for example, a state in which the surfaces of the teeth of the ring gear 11 and the pinion gear 32 are separated from each other), the rotational angular acceleration of the ring gear 11 based on the drive of the rotating electrical machine 20 becomes smaller than the rotational angular acceleration of the pinion gear 32 based on the drive of the motor 31. Therefore, even when the ring gear 11 rotates with respect to the pinion gear 32 based on the drive of the rotating electrical machine 20 and the surfaces of the teeth collide with each other when engaging, the collision noise is suppressed as compared with a case in which collision is caused by rotating the pinion gear 32 based on the motor 31 drive.

Moreover, in the pre-drive period, when driving the rotating electrical machine 20, the ECU 100 performs control so that a current of a predetermined phase flows in the armature winding of the AC motor 21. Therefore, the rotation angle of the ring gear 11 is within a predetermined range (for example, within one pitch).

Incidentally, in this embodiment, the ECU 100 has a function as a drive instruction unit, but the drive instruction unit may be configured by hardware. For example, a drive circuit may be provided that instructs the rotating electrical machine 20 to rotate the ring gear 11 via the crankshaft 10a in the pre-drive period.

In addition, in this embodiment, the ECU 100 controls the starting torque of the rotating electrical machine 20 so that the rotational angular acceleration of the ring gear 11 is reduced, however the control device 26 of the rotating electrical machine 20 may control the starting torque. For example, in the pre-drive period, the control device 26 may control the starting torque so that the rotational angular acceleration of the ring gear 11 is reduced. In this case, the control device 26 of the rotating electrical machine 20 has a configuration for reducing the rotational angular acceleration. In this case, the rotating electrical machine 20 is included in the starting device.

In addition, in this embodiment, the ECU 100 controls the starting torque of the rotating electrical machine 20 so that the rotational angular acceleration of the ring gear 11 is reduced, however, this may be realized by a hardware configuration. For example, the starting torque of the rotating electrical machine 20 is configured to be constant. At the same time, the inertia of each shaft, gear ratio, pulley ratio, starting torque and the like may be configured so that the rotational angular acceleration of the ring gear 11 based on the drive of the rotating electrical machine 20 is smaller than the rotational angular acceleration of the pinion gear 32 based on the drive of the motor 31. As a result, the ECU 100 can reduce the rotational angular acceleration by just controlling the drive of the rotating electrical machine 20. In this case, the rotating electrical machine 20 and the starter 30 have a configuration for reducing the rotational angular acceleration. Moreover, in this case, the starter 30 and the rotating electrical machine 20 are included in the starting device.

Figure 4:
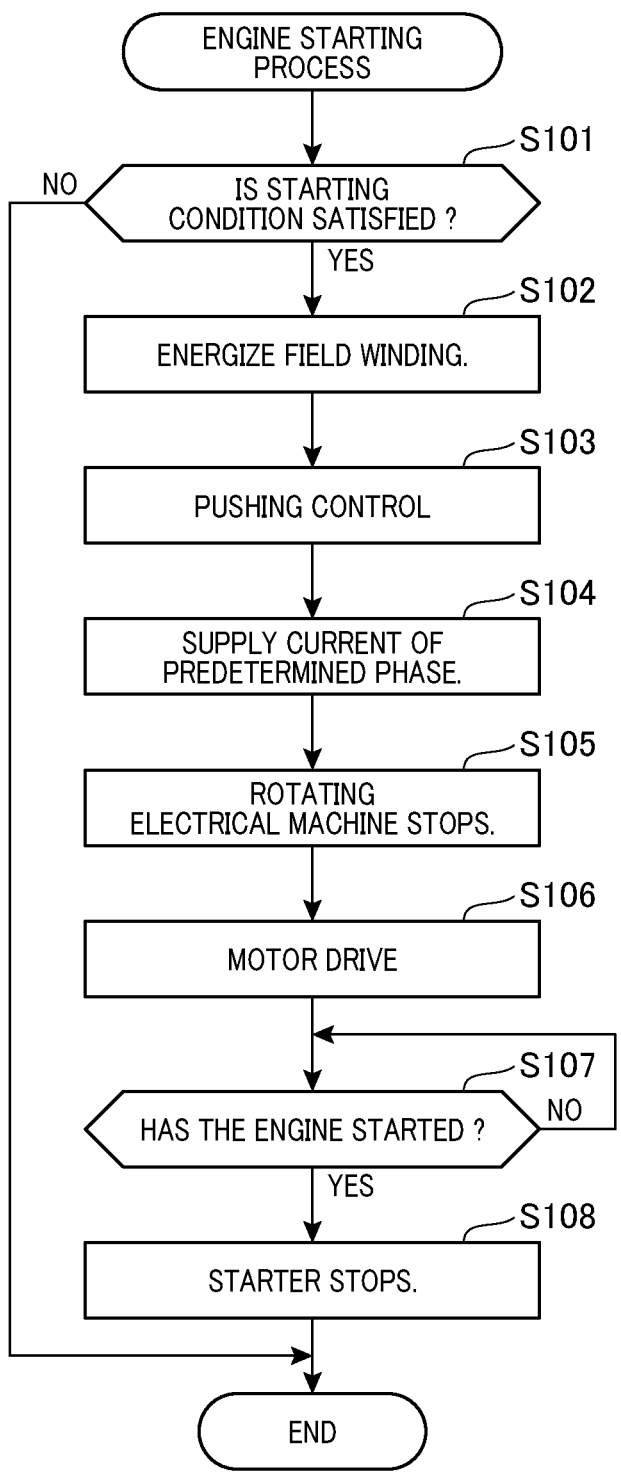
FIG. 4 is a flowchart illustrating the flow of an engine starting process.
Figure 5:
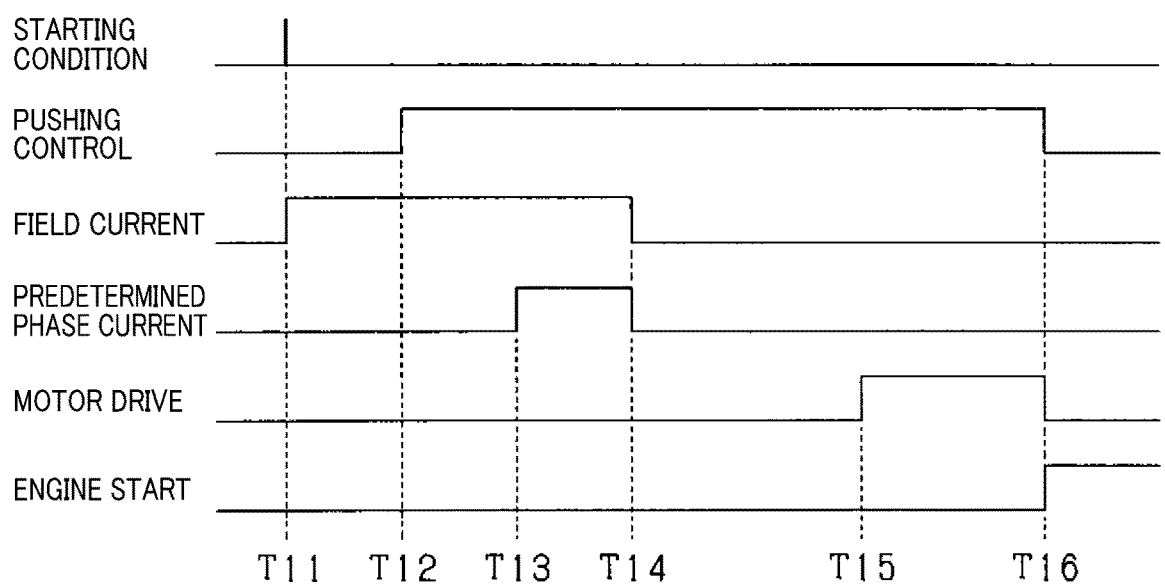
FIG. 5 is a timing chart illustrating control timing.

Next, the engine starting process will be described based on FIG. 4. The engine starting process is executed by the ECU 100 at each predetermined period.

The ECU 100 determines whether a starting condition of the engine 10 is satisfied (step S101). A starting condition of the engine 10 may be satisfied, for example, when information indicating that the ignition switch has been turned ON is acquired. In addition, a starting condition is satisfied, for example, when during an idling stop, information indicating that the operation of the brake pedal of the vehicle is released and the accelerator pedal is operated is acquired. When it is not determined that a starting condition is satisfied (step S101: NO), the ECU 100 ends the engine starting process.

When it is determined that a starting condition is satisfied (step S101: YES), the ECU 100 controls the rotating electrical machine 20 so that a field current flows in the field winding 23 (step S102). More specifically, the ECU 100 outputs a control signal instructing to allow a field current to flow to the field winding 23 to the control device 26. The control device 26, based on the control signal, allows a field current to flow to the field winding 23. As a result, the field winding 23 is excited.

After a predetermined time t1 has elapsed from step S102, the ECU 100 performs pushing control for pushing out the pinion gear 32 toward the ring gear 11 side (step S103). More specifically, the ECU 100 closes the pushing switch 37 to supply power to the pushing member 33. As a result, the pushing member 33 pushes out the pinion gear 32 toward the ring gear 11 side. At this point in time, it is often the case that there will be no engagement by just the end surface of the ring gear 11 and the end surface of the pinion gear 32 coming in contact with each other.

After a predetermined time t2 has elapsed from step S103, the ECU 100 controls the rotating electrical machine 20 so that a current of a predetermined phase flows in the armature winding of the AC motor 21 (step S104). More specifically, the ECU 100 controls turning ON/OFF each of the switches Sup to Swn so that current flows from any one predetermined winding 24U to 24W to another one winding 24U to 24W, among the phase winding 24U to 24W.

For example, the ECU 100 outputs a control signal to turn ON the U-phase upper arm switch SUp and the W-phase lower arm switch SWn so that current flows from the U-phase winding 24U to the W-phase winding 24W. When that control signal is inputted, the control device 26 turns ON the U-phase upper arm switch SUp and the W-phase lower arm switch SWn. As a result, the stator 24 is excited, the U-phase winding 24U becomes a N pole, and the W-phase winding 24W becomes a S pole. Together with that, the rotor 22 rotates so that the magnetic poles of the stator 24 and the magnetic poles of the rotor 22 respectively become different. Note that the phase of the current may be changed arbitrarily. The rotor 22 rotates, whereby the connected ring gear 11 is made to rotate. The ring gear 11 rotates against the frictional force with the pinion gear 32 that is in contact, so as will be described later, teeth of the pinion gear 32 fits in the space between teeth of the ring gear 11.

After a predetermined amount of time t3 has elapsed from step S104, the ECU 100 controls the rotating electrical machine 20 so as to stop (step S105). More specifically, the ECU 100 outputs a control signal for controlling the rotating electrical machine 20 so as to cut off current to the field winding 23, and cut off current to each phase winding 24U to 24W. When the control signal is inputted, the control device 26 cuts off current to the field winding 23 and turns OFF the each of the switches SUp to SWn. As a result, driving of the ring gear 11 is stopped.

Next, the ECU 100 closes (turns ON) the motor switch 34 in order to drive the motor 31 (step S106). As a result, the pinion gear 32 rotates based on the drive of the motor 31, and the gear teeth 32a of the pinion gear 32 rotate in the space between teeth of the ring gear 11, so the surfaces of the teeth of the pinion gear 32 collide with the surfaces of the teeth of the ring gear 11, and driving force is transmitted from the gear teeth 32a of the pinion gear 32 to the gear teeth 11a of the ring gear 11, causing the ring gear 11 to rotate. When the ring gear 11 rotates due to driving of the motor 31, the engine 10 starts.

The ECU 100 determines whether the engine 10 has started (step S107). For example, when the ECU 100 acquires a notification indicating that the engine 10 has started, the ECU 100 determines that the engine 10 has started. When it is not determined that the engine 10 has started (step S107: NO), the process of step S107 is repeated until the engine 10 is started.

When it is determined that the engine 10 has started (step S107: YES), the ECU 100 stops the starter 30 (step S108). In other words, the ECU 100 opens the pushing switch 37 and causes pushing (pushing control) of the pinion gear 32 by the pushing member 33 to end. In addition, the ECU 100 opens the motor switch 34 to stop the driving of the motor 31. Then, the engine starting process ends.

Here, various control timings from satisfying the starting condition of the engine 10 to the start of the engine 10 and the operation thereof will be described based on FIG. 5 and FIG. 6A to FIG. 6C.

When the starting condition of the engine 10 is satisfied (time T11), a field current flows in the field winding 23, and the field winding 23 is excited.

Figure 6A:
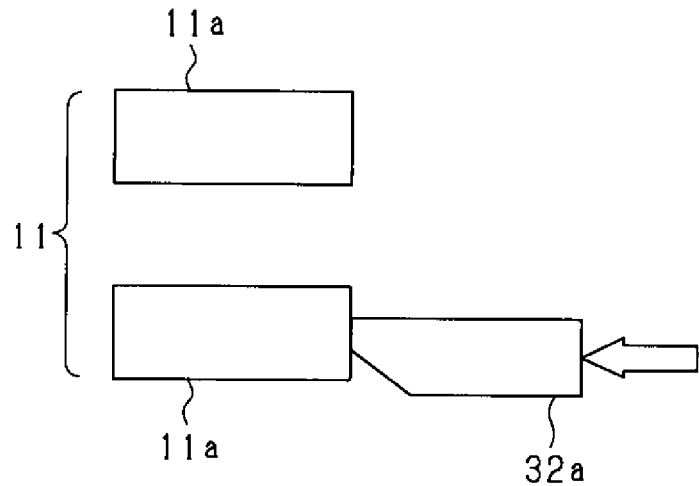
FIGS. 6A to 6C are schematic diagrams of a pinion gear and a ring gear.

After the predetermined time t1 has elapsed, the ECU 100 starts pushing control for pushing out the pinion gear 32 toward the ring gear 11 (at time T12). As a result, in the initial state, in a case where the pinion gear 32 and the ring gear 11 are not in an engaging position, the side surfaces of the pinion gear 32 and the ring gear 11 collide with each other as illustrated in FIG. 6A.

Figure 6B:
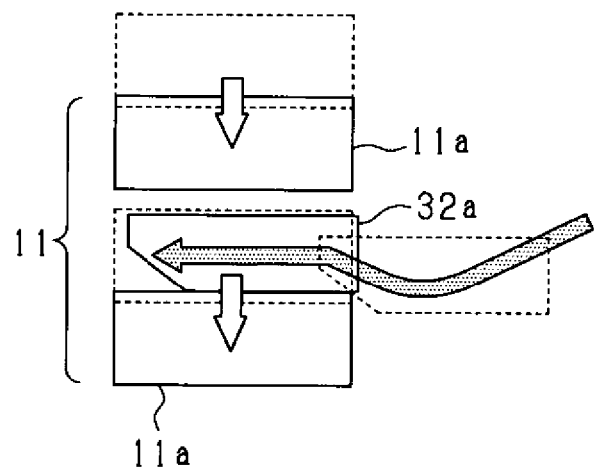

Next, after the predetermined time t2 has elapsed, a current of a predetermined phase flows in the armature winding of the AC motor 21 (at time T13). As a result, the rotating electrical machine 20 is driven, and the ring gear 11 rotates in a predetermined direction along with that driving. Thus, for example, as shown in FIG. 6B, the ring gear 11 rotates with respect to the pinion gear 32 until the gear teeth 11a of the ring gear 11 and the gear teeth 32a of the pinion gear 32 are in an engaging position. Then, the pushing member 33 continues pushing out the pinion gear 32, that is, pushing control is continuing, so the pinion gear 32 is pushed out so that there is engagement with the ring gear 11.

At this time, when the ring gear 11 engages with the pinion gear 32 with the rotation of the ring gear 11 based on the drive of the rotating electrical machine 20, there is a possibility that the surfaces of the teeth of the pinion gear 32 and the ring 11 may collide. However, the rotational angular acceleration of the ring gear 11 based on the drive of the rotating electrical machine 20 is smaller than the rotational angular acceleration of the pinion gear 32 based on the drive of the motor 31. Therefore, collision noise is suppressed more as compared to the case of rotating the pinion gear 32 based on the drive of the motor 31.

Figure 6C:
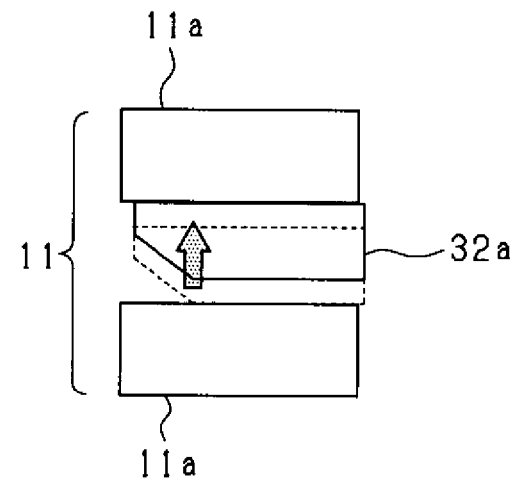

After the predetermined time t3 has elapsed, the current to the field winding 23 is cut off, and the current to each of the phase windings 24U to 24W is cut off (at time T14). After that, the motor 31 drives (at time T15). As a result, as illustrated in FIG. 6C, the surfaces of the teeth of the pinion gear 32 and the ring gear 11 collide with each other, the ring gear 11 rotates with the drive of the motor 31, and the engine 10 starts. After the engine starts (at time T16), pushing control ends and the driving of the motor 31 ends.

At the time when the motor 31 is driving, as illustrated in FIG. 6C, in the case where the gear teeth 32a of the pinion gear 32 and the gear teeth 11a of the ring gear 11 are arranged at an engaging position, the distance to where surfaces of the teeth of the gear teeth 32a of the pinion gear 32 and the gear teeth 11a of the ring gear 11 collide with each other is short, and the speed does not increase until collision, so even though the gears 32, 11 collide based on the drive of the motor 31, the collision noise is suppressed. Moreover, since the contact surface between the pinion gear 32 and the ring gear 11 is large, even though the pinion gear 32 and the ring gear 11 collide with each other as the motor 31 is driven, the surface pressure during collision can be reduced and durability is improved.

According to the embodiment described above, the following excellent effects can be obtained.

After the pinion gear 32 is pushed out, and during the pre-drive period before the motor 31 drives, the ECU 100 causes the ring gear 11 to be rotated via the crankshaft 10a of the engine 10. As a result, even in a case where the pinion gear 32 and the ring gear 11 do not engage after the pushing member 33 has pushed out the pinion gear 32, there is a possibility that the ring gear 11 will rotate based on the drive of the rotating electrical machine 20 before the motor 31 drives, causing the pinion gear 32 to engage with the ring gear 11.

Moreover, there is configuration so that in the pre-drive period, the rotating electrical machine 20 is driven so as to make the rotational angular acceleration of the ring gear 11 smaller than the rotational angular acceleration of the pinion gear 32 based on the drive of the motor 31. More specifically, the inertia of the drive target of the rotating electrical machine 20 is large, so the rotational angular acceleration of the ring gear 11 can be easily set to be smaller than the rotational angular acceleration of the pinion gear 32 when energizing and driving the motor 31. As a result, the rotational angular acceleration of the ring gear 11 accompanying the drive of the rotating electrical machine 20 can be made smaller than the rotational angular acceleration of the pinion gear 32 accompanying the drive of the motor 31.

In other words, the ECU 100 supplies a current of a predetermined phase to the AC motor 21, whereby the rotating electrical machine 20 is driven so that the rotational angular acceleration of the ring gear 11 is made to be smaller than the rotational angular acceleration of the pinion gear 32 based on the drive of the motor 31.

As a result, the ECU 100 as a drive instruction unit causes the ring gear 11 to engage with the pinion gear 32 by driving the ring gear 11 by the electrical machine 20 without driving the pinion gear 32 by the motor 31, whereby collision noise can be reduced.

In other words, as the ring gear 11 rotates based on the drive of the rotating electrical machine 20, the ring gear 11 moves to an engaging position with the pinion gear 32, and the pinion gear 32 is pushed toward ring gear 11 by the pushing member 33. At that time, even though the engaging surfaces (surfaces of the teeth) of the gears 11, 32 collide with each other, the rotational angular acceleration of the ring gear 11 based on driving by the rotating electrical machine 20 is smaller than the rotational angular acceleration based on the drive of the motor 31, so the collision noise can be suppressed in comparison with the collision noise based on the drive of the motor 31. Incidentally, even though the rotating electrical machine 20 exerts a driving torque larger than normal due to the rush current, because of the inertia, the collision noise can be made smaller than the collision noise based on the drive of the motor 31.

Moreover, even when the rotation angle of the crankshaft 10a or the ring gear 11 is not measured, the ring gear 11 can be rotated within a predetermined range by supplying a current of a predetermined phase. As a result, while the ring gear 11 can be properly engaged with the pinion gear 32, it is possible to suppress the collision based on the rotation of the ring gear 11.

Moreover, the control by the ECU 100 may be changed, and collision noise can be suppressed without changing the configuration of the rotating electrical machine 20 and the starter 30.

Particularly, after the pushing member 33 pushes out the pinion gear 32 during the pre-drive period before the motor 31 drives, the rotating electrical machine 20 rotates the ring gear 11, according to an instruction from the ECU 100 to the rotating electrical machine 20.

As a result, the ECU 100 causes the pinion gear 32 to be pushed out toward the stationary ring gear 11, so the collision noise at the time of contact can be further reduced.

Note that, because the pinion gear 32 is pushed to abut on the stationary ring gear 11, the pinion gear 32 and the ring gear 11 have a state where their end surfaces are in contact with each other. In this state, when the ring gear 11 is rotated by the rotating electrical machine 20 via the crankshaft 10a, a large driving force is required for the rotating electrical machine 20 against the static friction coefficient between the end surfaces.

On the other hand, before the pushing member 33 pushes out the pinion gear 32 during the pre-drive period before the motor 31 drives, the rotating electrical machine 20 may rotate the ring gear 11 via the crankshaft 10a. As a result, the pinion gear 32 is pushed out toward the rotating ring gear 11, so the collision noise at the time of contact is relatively large. However, since only a dynamic friction coefficient that is generally smaller than the static friction coefficient is generated between the rotating ring gear 11 and the pinion gear 32, only a relatively small driving force is required for the rotating electrical machine 20.

Note that the timing at which the ECU 100 instructs the rotating electrical machine 20 and the timing at which the ring gear 11 actually starts to rotate are not necessarily the same, and the rotation may start after a predetermined delay time from the time of the instruction. Therefore, for the rotating electrical machine 20 to rotate the ring gear 11 immediately after the pushing member 33 has pushed out the pinion gear 32, it is necessary to set the instruction timing in consideration of the delay time.

Second Embodiment

Figure 7:
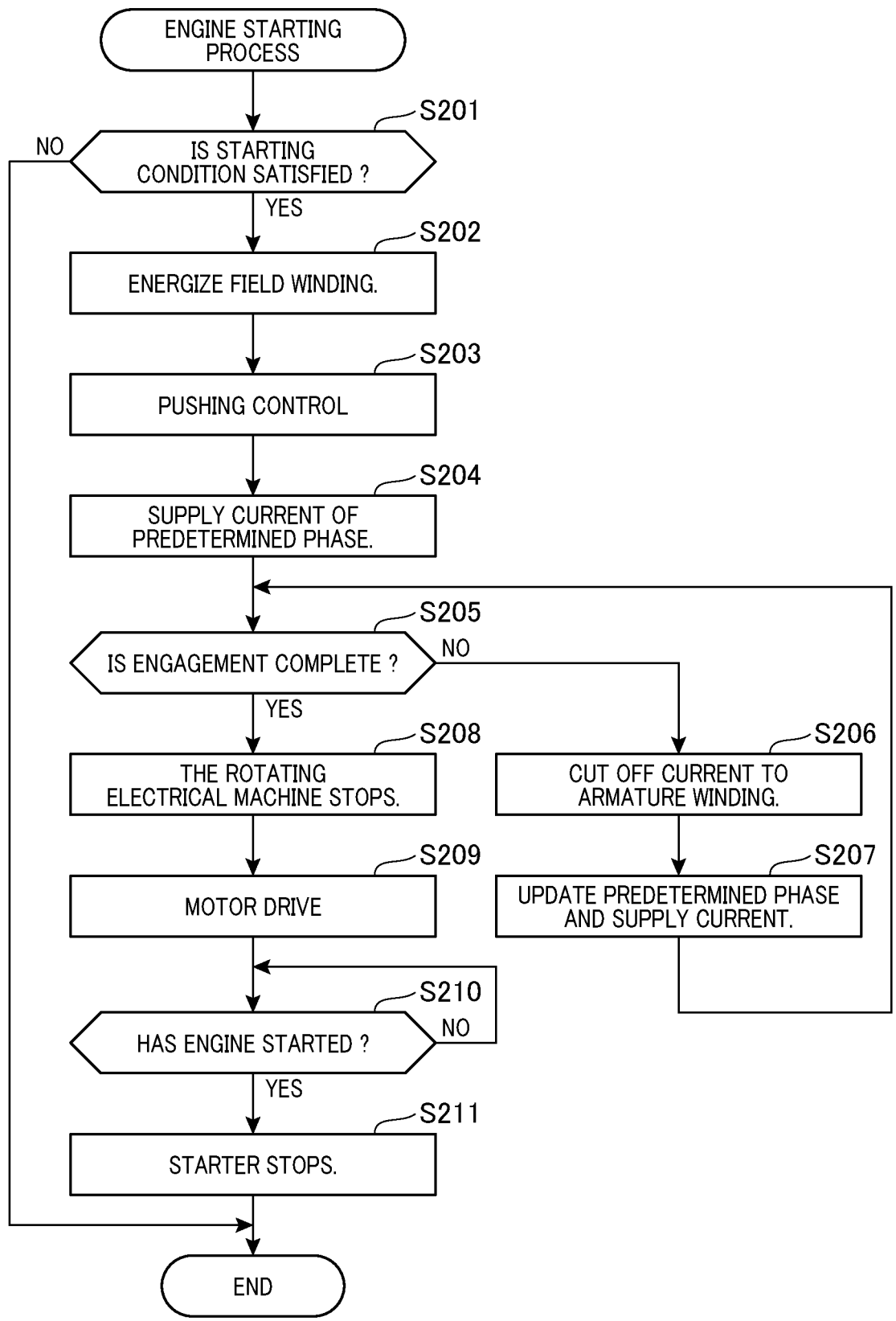
FIG. 7 is a flowchart illustrating the flow of an engine starting process.

Depending on the positional relationship between the rotor 22 and the stator 24, the ring gear 11 may not necessarily rotate until the ring gear 11 engages with the pinion gear 32 even when current of a predetermined phase is supplied. For example, in the initial state (during energization of the armature winding), in a case where the magnetic poles of the stator 24 and the magnetic poles of the rotor 22 are positionally away from each other or have a similar positional relationship therebetween, the rotor 22 does not rotate sufficiently. Therefore, in the second embodiment, the engine starting process illustrated in FIG. 7 is performed.

The ECU 100 determines whether a starting condition for starting the engine 10 is satisfied (step S201). When it is not determined that a starting condition is satisfied (step S201: NO), the ECU 100 ends the engine starting process.

When it is determined that a starting condition is satisfied (step S201: YES), the ECU 100 controls the rotating electrical machine 20 so that a field current flows in the field winding 23 (step S202). After a predetermined time t1 has elapsed from step S202, the ECU 100 causes the pushing member 33 to push out the pinion gear 32 toward the ring gear 11 (step S203).

After a predetermined time t2 has elapsed from step S203, the ECU 100 controls the rotating electrical machine 20 so that a current of a predetermined phase flows (step S204). Next, the ECU 100 determines whether the pinion gear 32 and the ring gear 11 have engaged with each other (step S205). More specifically, the ECU 100 determines, based on the angle of rotation of the ring gear 11 detected by an angle sensor, whether the ring gear 11 has rotated at least a predetermined angle (for example, an angle corresponding to one pitch).

When it is not determined that engagement has occurred (step S205: NO), the ECU 100 controls the rotating electrical machine 20 so as to cut off the current to the armature winding (step S206). Then, the ECU 100 updates the predetermined phase so as to set the predetermined phase to a different phase, and controls the rotating electrical machine 20 so that current of the updated predetermined phase flows (step S207). In other words, the ECU 100 causes a current of a phase different from the predetermined phase to flow. Here, a different phase is a phase in which the phase of the current is different, and includes not only a difference in the respective phase windings 24U to 24W to be energized but also includes cases in which the current direction is different. For example, the phase of the current from the U-phase winding 24U to the W-phase winding 24W and the phase of current from the W-phase winding 24W to the U-phase winding 24U are different.

In this embodiment, the predetermined phase is updated so that the ring gear 11 is rotated in the positive direction. Among the direction of rotation of the ring gear 11, the positive direction is the direction in which the ring gear 11 is rotated when the engine 10 is started, and is the direction in which the ring gear 11 is rotated by the pinion gear 32 accompanying the drive of the motor 31.

More specifically, when the U-phase upper arm switch SUp and the W-phase lower arm switch SWn are turned ON, the V-phase upper arm switch SVp and the W-phase lower arm switch SWn are turned ON. Incidentally, in the following, the current from the U-phase winding 24U to the W-phase winding 24W is referred to as the first-phase current, and the current from the V-phase winding 24V to the W-phase winding 24W is referred to as the second-phase current.

The ECU 100 executes the process of step S207, and then after a predetermined time has elapsed, executes the process of step S205 again. When it is determined that there is engagement (step S205: YES), the ECU 100 controls the rotating electrical machine 20 so as to stop (step S208). Next, the ECU 100 closes (turns ON) the motor switch 34 in order to drive the motor 31 (step S209). The ECU 100 determines whether the engine 10 has started (step S210). When it is not determined that the engine 10 has started (step S210: NO), the ECU 100 repeats the process of step S210.

When it is determined that the engine 10 has started (step S210: YES), the ECU 100 stops the starter 30 (step S311). Then, the engine starting process ends.

Figure 8:
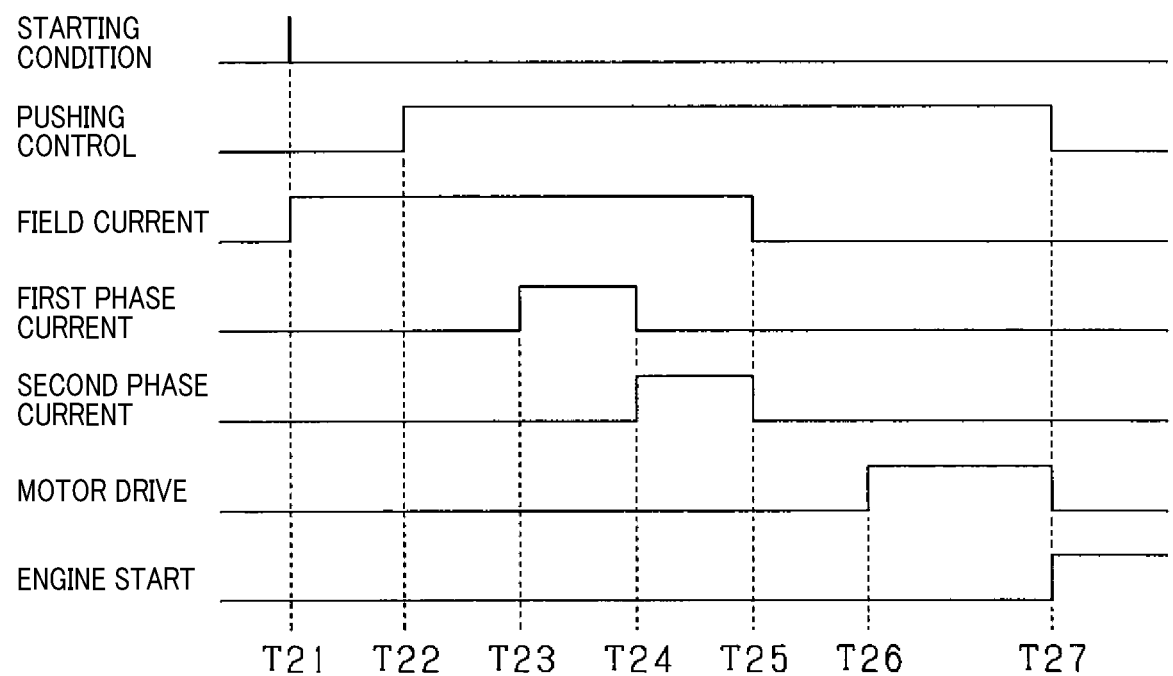
FIG. 8 is a timing chart illustrating control timing.

Here, the control timing will be described based on FIG. 8.

When the starting condition of the engine 10 is satisfied (time T21), a field current flows in the field winding 23, and the field winding 23 is excited. Next, the pushing member 33 pushes out the pinion gear 32 toward the ring gear 11 side (at time T22). After the predetermined time t2 has elapsed, the first phase current flows in the AC motor 21 (at time T23). Here, when it is not determined that the ring gear 11 and the pinion gear 32 have engaged, the second phase current flows in the AC motor 21 (at time T24). In this way, current flows in the phase windings 24U to 24W of the AC motor 21 and the ring gear 11 is rotated in the positive direction until it is determined that the ring gear 11 and the pinion gear 32 have engaged. In other words, currents of different phases are supplied and the ring gear 11 is rotated until the ring gear 11 and the pinion gear 32 reach an engaging position.

When it is determined that the ring gear 11 and the pinion gear 32 are engaged, the current supplied to the field winding 23 is cut off and the current supplied to each of the phase windings 24U to 24W is cut off (at time T25). After that, the motor 31 is driven (at time T26). As a result, the surfaces of the teeth of the pinion gear 32 and the ring gear 11 collide with each other, the ring gear 11 rotates with the drive of the motor 31, and the engine 10 starts. After the engine starts (at time T27), pushing control ends and the driving of the motor 31 ends.

According to the embodiment described above, the following excellent effects can be obtained in addition to the effects of the first embodiment.

In the state before energization, depending on the positional relationship between the rotor 22 and the stator 24, the ring gear 11 may not rotate in some cases even when current of a predetermined phase is supplied. Therefore, after a current of a predetermined phase flows, a current of a phase different from the predetermined phase flows. As a result, the ring gear 11 can be reliably rotated. Therefore, by rotating the ring gear 11 before the drive of the motor 31, the ring gear 11 and the pinion gear 32 can engage with each other.

The motor 31 is connected to the pinion gear 32 via a clutch 35 that cuts off the power from the ring gear 11 when the ring gear 11 rotates in the positive direction based on the rotation of the crankshaft 10a. Therefore, for example, even when the ring gear 11 is rotated in the positive direction with the drive of the rotating electrical machine 20 and the ring gear 11 collides with the pinion gear 32, the clutch 35 can prevent the impact force from being transmitted to the motor 31. As a result, the durability of the motor 31 can be improved.

Third Embodiment

Figure 9:
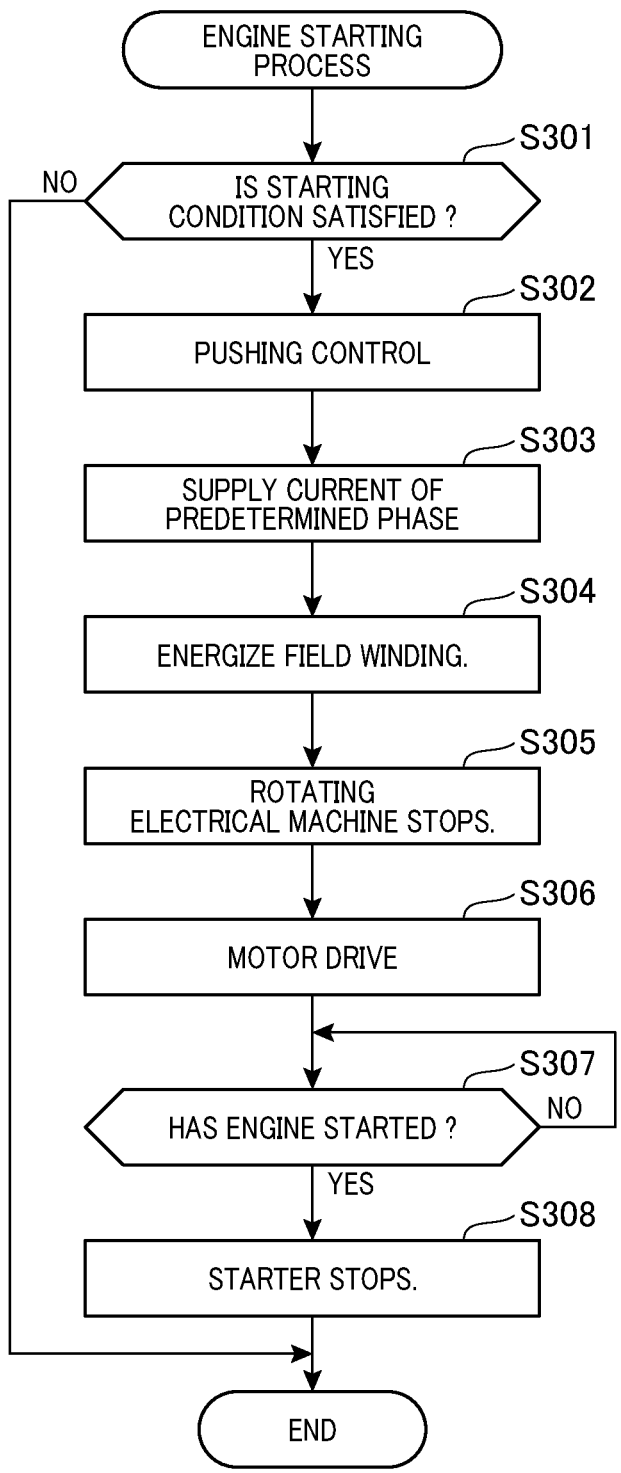
FIG. 9 is a flowchart illustrating the flow of an engine starting process.

In the third embodiment, in order to reduce the starting torque of the rotating electrical machine 20, the ECU 100 executes the engine starting process illustrated in FIG. 9. This is described in detail below.

The ECU 100 determines whether a starting condition for starting the engine 10 is satisfied (step S301). When it is not determined that a starting condition is satisfied (step S301: NO), the ECU 100 ends the engine starting process.

When it is determined that the starting condition is satisfied (step S301: YES), the ECU 100 causes the pushing member 33 to push out the pinion gear 32 toward the ring gear 11 (step S302).

The ECU 100 controls the rotating electrical machine 20 so that a current of a predetermined phase flows (step S303). After a predetermined time ti1 has elapsed from step S303, the ECU 100 controls the rotating electrical machine 20 so that a field current flows in the field winding 23 (step S304). After that, the ECU 100 executes the processing of steps S305 to S308 in the same way as the processing of steps S105 to S108 of the first embodiment.

Figure 10:
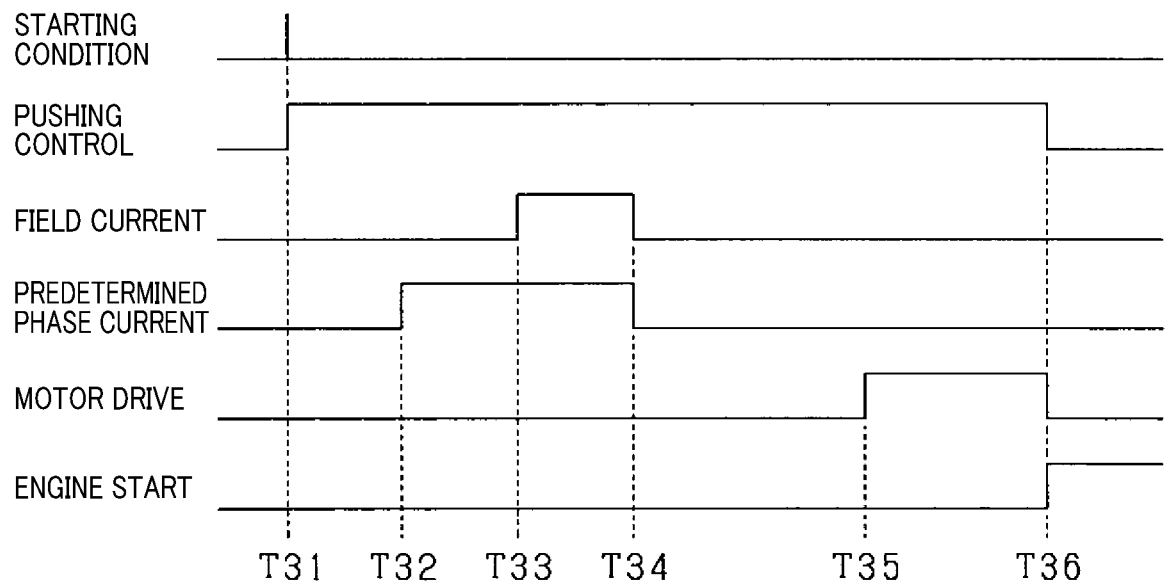
FIG. 10 is a timing chart illustrating control timing.

Here, the control timing and the operation thereof will be described based on FIG. 10.

When the starting condition of the engine 10 is satisfied (at time T31), the pushing control for pushing out the pinion gear 32 toward the ring gear 11 side is started. After that, a current of a predetermined phase flows in the AC motor 21 (at time T32). After a predetermined time ti1 has elapsed, a field current flows in the field winding 23, and the field winding 23 becomes excited (at time T33). Thereby, the rotating electrical machine 20 is driven, and the ring gear 11 rotates in the positive direction or the negative direction as a result of this driving.

After the predetermined time t3 has elapsed, the current to the field winding 23 is cut off, and the current to each of the phase windings 24U to 24W is cut off (at time T34). After that, the motor 31 is driven (at time T35). As a result, the pinion gear 32 and the ring gear 11 collide with each other, the ring gear 11 rotates driven by the motor 31, and the engine 10 starts. After the engine starts (at time T36), pushing control ends and the driving of the motor 31 ends.

According to the third embodiment described above, the following excellent effects can be obtained in addition to the effects of the first embodiment.

In the third embodiment, after a current of a predetermined phase is supplied to the AC motor 21, a field current is supplied to the field winding 23. Even in a case where the field winding 23 is energized, it takes time to become excited. In other words, it takes time until rotation. Therefore, in comparison with a case where a current of a predetermined phase flows after the field winding 23 is excited, in a case where the field current flows in the field winding 23 after the current of a predetermined phase flows, it is possible to reduce the starting torque. In other words, the rotational angular acceleration of the ring gear 11 accompanying the drive of the rotating electrical machine 20 can be further reduced. Particularly, the effect of the rush current on the armature winding can be suppressed. Therefore, in a case where the ring gear 11 is rotated based on the drive of the rotating electrical machine 20, even when the ring gear 11 and the pinion gear 32 collide, the collision noise can be suppressed.

Fourth Embodiment

Figure 11:
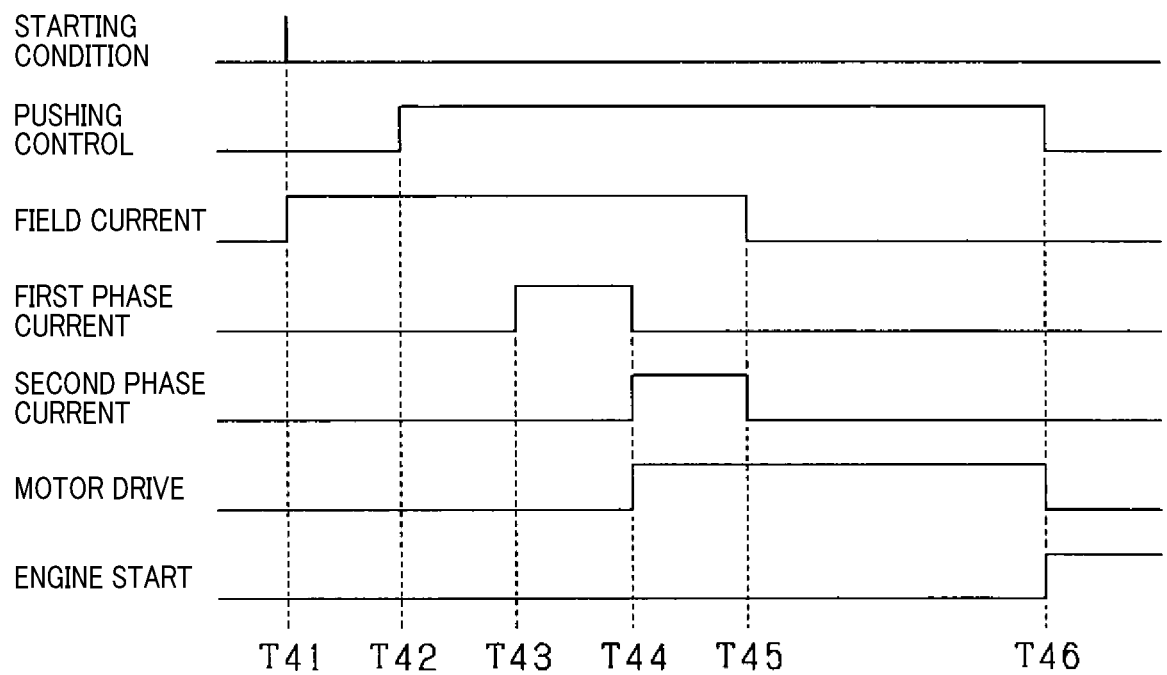
FIG. 11 is a timing chart illustrating control timing.

In the fourth embodiment, the drive timing of the motor 31 is changed as illustrated in FIG. 11. When the starting condition of the engine 10 is satisfied (at time T41), a field current flows in the field winding 23, and the field winding 23 is excited. Then, the pushing control for pushing out the pinion gear 32 toward the ring gear 11 side by the pushing member 33 is started (at time T42). The first phase current flows in the AC motor 21 (time T43).

Next, in the AC motor 21, the current of the second phase flows, and the motor 31 drives (at time T44). In other words, while rotating the ring gear 11 in the positive direction by the rotating electrical machine 20, the motor 31 is driven. As a result, the ring gear 11 and the pinion gear 32 rotate in the same direction.

Note that the motor 31 is driven at the same time that the ring gear 11 is rotated in the positive direction, however this is not limited to being the same time, as long as the time is near the start of rotation in the positive direction. In this embodiment, the ECU 100 functions as a motor driving unit, however it is possible to include a drive circuit for driving the motor 31.

After that, the current flowing to the field winding 23 is cut off, and the current flowing to the phase windings 24U to 24W is cut off (at time T45). After the engine 10 starts (at time T46), pushing control ends and the driving of the motor 31 ends.

According to the embodiment described above, the following excellent effects can be obtained in addition to the effects of the first embodiment.

After the pinion gear 32 is pushed out to the ring gear 11 side, the ECU 100 rotates the ring gear 11 in the positive direction. Then, the ECU 100 drives the motor 31 when the ring gear 11 rotates in the positive direction (that is, when the second phase current flows). Therefore, the ring gear 11 and the pinion gear 32 rotate in the same direction. Accordingly, the difference in speed between the rotational speed of the pinion gear 32 based on the drive of the motor 31 and the rotational speed of the ring gear 11 based on the drive of the rotating electrical machine 20 can be reduced. In other words, even when the surfaces of the teeth of the pinion gear 32 and the ring gear 11 collide with each other, the collision noise can be suppressed.

Fifth Embodiment

Figure 12:
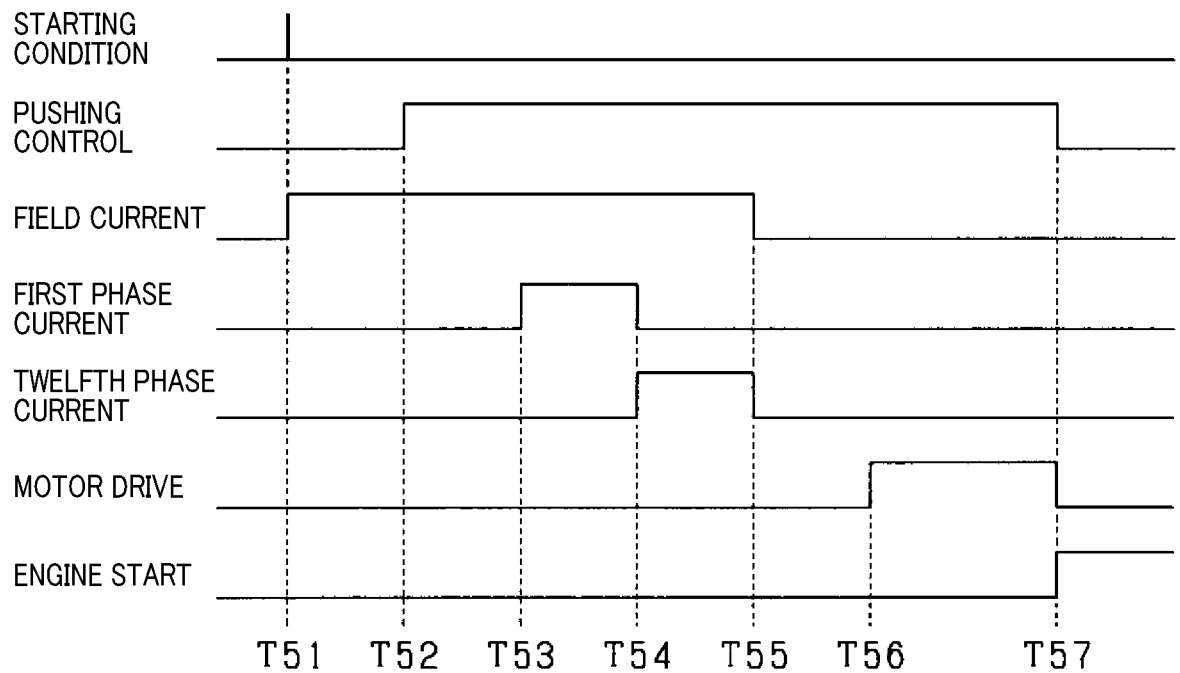
FIG. 12 is a timing chart illustrating control timing.

In the fifth embodiment, the direction of rotation of the ring gear 11 is a negative direction. This will be described based on FIG. 12. When the starting condition of the engine 10 is satisfied (at time T51), a field current flows in the field winding 23, and the field winding 23 is excited. Next, the pushing member 33 starts pushing out the pinion gear 32 toward the ring gear 11 side (at time T52). The first phase current flows in the armature winding of the AC motor 21 (at time T53). Next, a twelfth phase current flows in the armature winding of the AC motor 21 (at time T54).

The 12th phase current is a current of a phase in which the rotating electrical machine 20 rotates the ring gear 11 in the opposite direction (negative direction) to the direction (positive direction) in which the ring gear 11 is rotated by the pinion gear 32. In this embodiment, when the current from the U-phase winding 24U to the W-phase winding 24W is the first phase current, the current from the U-phase winding 24U to the V-phase winding 24V is the 12th phase current. The ring gear 11 rotates in the opposite direction (negative direction), so it becomes possible for the pinion gear 32 and the ring gear 11 to be deep engaged.

After that, the current flowing to the field winding 23 is cut off, and the current flowing to the phase windings 24U to 24W is cut off (at time T55). The motor 31 drives (at time T56). As a result, the pinion gear 32 and the ring gear 11 collide, the ring gear 11 rotates with the drive of the motor 31, and the engine 10 starts. After the engine starts (at time T57), pushing control ends and the driving of the motor 31 ends.

According to the embodiment described above, the following excellent effects can be obtained in addition to the effects of the first embodiment.

The ring gear 11 is rotated based on the drive of the rotating electrical machine 20 in the opposite direction (negative direction) to the direction (positive direction) in which the ring gear 11 is rotated by the pinion gear 32. Therefore, it becomes possible for the pinion gear 32 and the ring gear 11 to be deep engaged with each other. Then, by the pinion gear 32 and the ring gear 11 deep engaging before the motor 31 is driven, the contact area of (the area of engagement surface) between the pinion gear 32 and the ring gear 11 can be increased. Therefore, the durability of the pinion gear 32 and the ring gear 11 can be improved.

Other Embodiments

The technique according to the present disclosure is not limited to the above embodiments, and, for example, may also be embodied as described below. Note that, in the following, the same reference numbers are given to portions that are the same or equivalent in each of the embodiments, and the description of the portions with the same reference signs is applied by reference.

An elastic member such as a spring or the like may be provided between the motor 31 and the pinion gear 32. More specifically, when the pushing member 33 pushes out the pinion gear 32 to the ring gear 11 side, an elastic member that contracts in the axial direction may be provided when the side surfaces of the pinion gear 32 and the ring gear 11 collide with each other. Then, the pinion gear 32 may be pushed out by the elastic member until the pinion gear 32 and the ring gear 11 engage with each other. Incidentally, by providing such an elastic member, it is possible to absorb the reaction force applied to the pinion gear 32 when the side surfaces collide with each other, and to suppress the collision noise.

Figure 13:
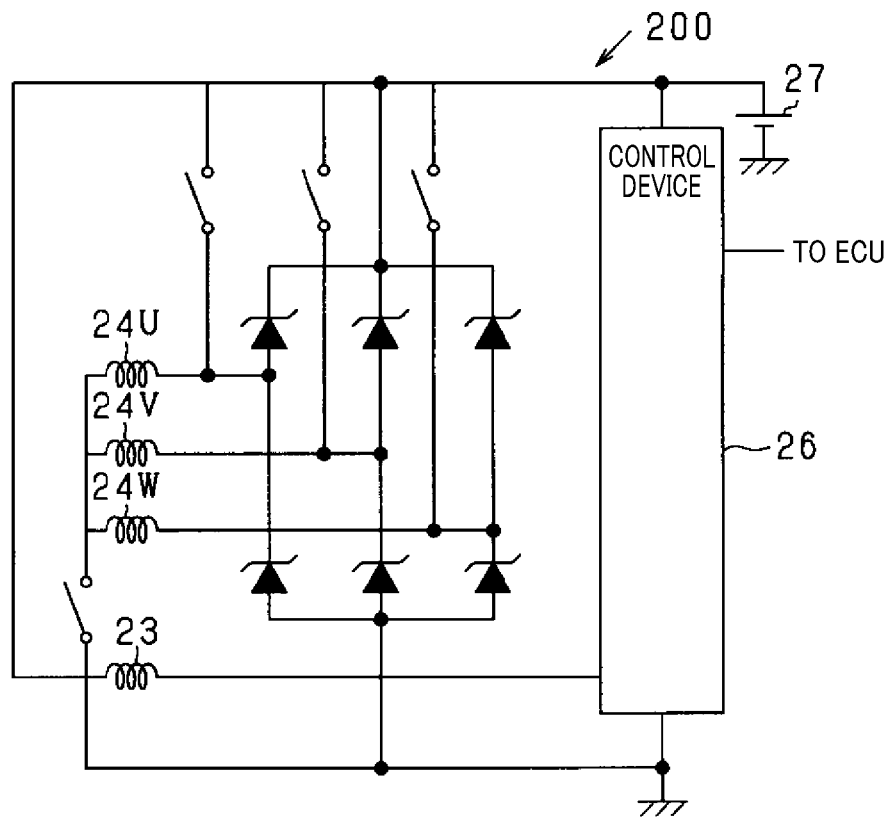
FIG. 13 illustrates the configuration of a rotating electrical machine.

Instead of an inverter 25, a rectifier 200 that converts alternating current into direct current by a plurality of rectifying elements as illustrated in FIG. 13 may be used. In this case, it is preferable that a switch be provided in each electrical path connecting one end of each phase winding and the positive terminal of the battery 27, and that a switch be provided in each electrical path connecting the other end of each phase winding and the GND terminal. As a result, a current of a predetermined phase can flow.

Figure 14A:
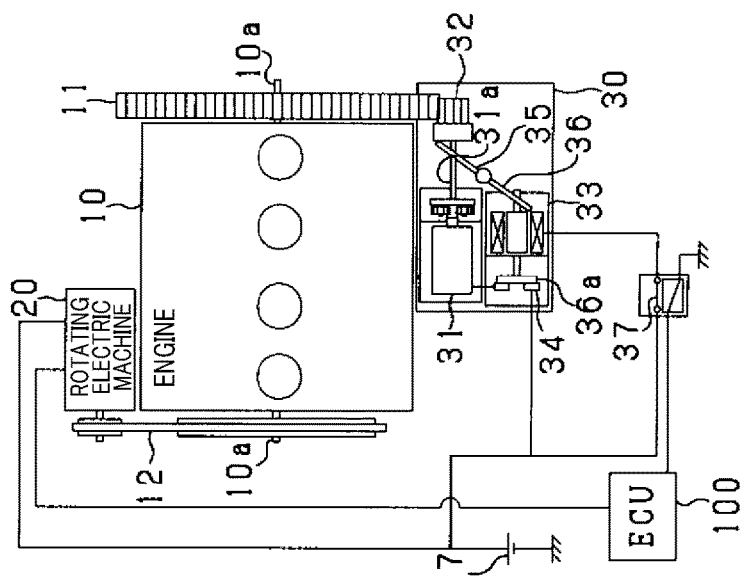
FIGS. 14A to 14C illustrate the overall configuration of a starting system.
Figure 14B:
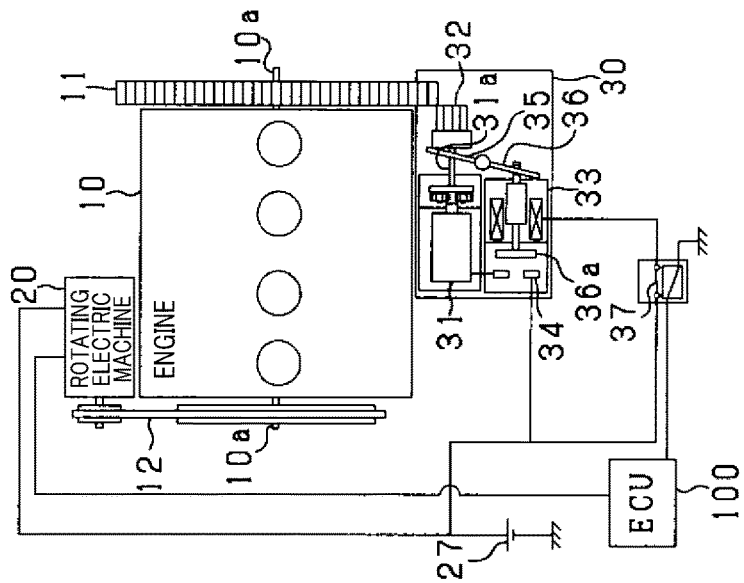
Figure 14C:
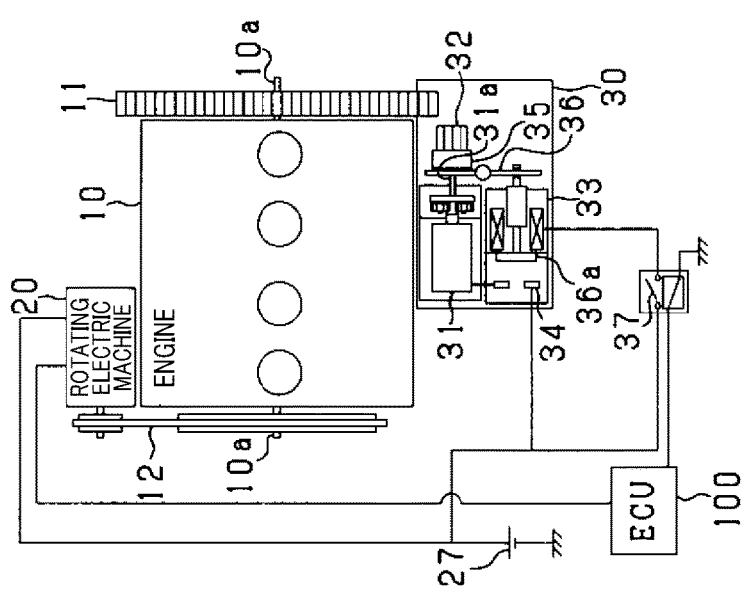

As illustrated in FIGS. 14A to 14C, a hardware mechanism may be provided for closing the motor switch 34 when the pinion gear 32 is pushed into and engaged with the ring gear 11. In other words, the pushing mechanism 36 that pushes out the pinion gear 32 toward the ring gear 11 side includes a movable contact 36a of the motor switch 34. This movable contact 36a is configured to move toward the motor switch 34 side in response to the pinion gear 32 being pushed into the ring gear 11, and close the motor switch 34 when the pinion gear 32 and the ring gear 11 engage with each other. As a result, when the pinion gear 32 reaches an engaging position with the ring gear 11, the motor switch 34 can be closed.

When a current flows in the armature winding of the AC motor 21, a phase current that will cause the ring gear 11 to rotate in a predetermined direction may be supplied. For example, the position of the rotor 22 in the initial state may be detected, and the predetermined phase may be determined based on the position. The predetermined direction may be either the positive or negative direction.

The rotating electrical machine 20 adopts an ISG having a starter function, however, as long as the crankshaft 10a can be rotated, the rotating electrical machine 20 does not need to have a function as a starter. In other words, the rotating electrical machine 20 does not need to be able to exert a starting torque so as to function as a starter. Moreover, there is no need to have a rotation angle sensor for maintaining rotation. For example, the rotating electrical machine 20 may be an alternator.

A helical spline may be provided in the output shaft 31a of the motor 31 so that the pinion gear 32 can be pushed into the ring gear 11 side while rotating the pinion gear 32. As a result, it becomes easier to engage the pinion gear 32 with the ring gear 11. In addition, by providing the helical spline so as to correspond to the direction of rotation of the ring gear 11, it becomes possible for the ring gear 11 and the pinion gear 32 to become more deep engaged. For example, in a case where the ring gear 11 is rotated in the negative direction, a helical spline may be provided to rotate the pinion gear 32 in the same direction when pushing out the pinion gear 32. Moreover, as illustrated in FIG. 3, the tooth tip of the pinion gear 32 may be chamfered.

In the embodiments above, a current of the predetermined phase is supplied after a predetermined time t2 has elapsed after pushing control is executed, however the current of the predetermined phase may be supplied simultaneously with the pushing control.

In step S207 of the second embodiment, as long as the phase of the current is different, the predetermined phase may be updated in any way.

In the fourth embodiment or the fifth embodiment, the field current may be supplied after the first phase current is supplied. As a result, the starting torque can be further reduced and the collision noise can be suppressed.

In the second embodiment, the phase of the current is updated and the current is continuously supplied to the armature winding until engagement occurs, however it is possible to not determine whether engagement has occurred. For example, after a current of a predetermined phase has been supplied, a current of a phase different from the predetermined phase may be supplied, and then after that the rotating electrical machine 20 may be stopped without performing the determination.

In addition, the following ninth to twelfth disclosures also exist as the contents of the present specification as technical ideas regarding a rotating electrical machine or a starting electric motor unit used in a starting system for starting an engine described in the present specification.

(Ninth Aspect)

A rotating electrical machine (20) used in a starting system that includes a starting electric motor unit (30) including a motor (31) and a pushing member (33), the motor (31) receiving a rotation instruction from a drive instruction unit (100) to rotate a pinion gear (32), the pushing member (33) receiving a pushing instruction from the drive instruction unit to push the pinion gear toward a ring gear (11), the ring gear (11) rotating together with a crankshaft (10a) of an engine (10); the starting system being configured to push, using the pushing member, the pinion gear toward the ring gear, and drive the motor to rotate, based on driving force of the motor, the ring gear via the pinion gear, thus starting the engine; wherein during a pre-drive period before drive of the motor, the rotating electrical machine receives a rotation drive instruction from the drive instruction unit to thereby rotate the ring gear via the crankshaft.

As a result, it is possible to obtain a rotating electrical machine capable of reducing collision noise by a motor driving a ring gear to cause the ring gear to engage with a pinion gear, instead of driving the pinion gear to cause the pinion gear to engage with the ring gear.

(Tenth Aspect)

The rotating electrical machine rotates the ring gear via the crankshaft after the pushing member pushes the pinion gear during the pre-drive period before drive of the motor.

As a result, the pinion gear is pushed out toward the stationary ring gear, so it is possible to obtain a rotating electrical machine capable of further reducing collision noise at the time of contact.

(Eleventh Aspect)

A starting electric motor unit used in a starting system that includes a rotating electrical machine, the rotating electrical machine rotating, via a crankshaft of an engine, a ring gear of the engine together with the crankshaft, the starting electric motor unit comprising:
  a motor that receives a rotation instruction from a drive instruction unit to rotate a pinion gear; and
  a pushing member that receives a push instruction from the drive instruction unit to push the pinion gear toward the ring gear, the starting system being configured to engage the pinion with the ring gear and start the engine in cooperation with the pushing member pushing out the pinion gear toward the ring gear and rotating the ring gear via the crankshaft by the rotating electrical machine which has received the rotation drive instruction, wherein the starting electric motor unit is configured such that:
  the motor is driven in response to receiving the rotation instruction after engagement of the pinion and ring gear based on the cooperation to thereby rotate the pinion gear.

As a result, by causing the pinion gear and the ring gear to engage by the cooperation of pushing out the pinion gear and driving the ring gear, it is possible to avoid collision between the end surface of the pinion gear driven by the motor and the end surface of the ring gear, thereby a starting electric motor unit can be obtained that is capable of reducing the collision noise of the end surfaces. Moreover, it is not necessary to use the rotation of the motor for causing the pinion gear and the ring gear to engage. Furthermore, since in the state where the gear teeth of the ring gear are finished in the space between the teeth of the pinion gear, the pinion gear is rotated by the motor drive, the gear teeth of the pinion gear and the gear teeth of the ring gear collide at a low collision speed, so it is possible to obtain a starting electric motor that can reduce the collision noised between the gear teeth.

(Twelfth Aspect)

A starting electric motor unit wherein, the starting electric motor unit is configured such that:
the pushing member pushes out, during the pre-drive period before drive of the motor, the pinion gear before the rotating electrical machine rotates the ring gear via the crankshaft.

As a result, since the pinion gear is pushed out toward the stationary ring gear, the impact on the pinion gear at the time of contact can be further reduced.

The technique according to the present disclosure has been described based on the embodiments, however it is understood that the technique according to present disclosure is not limited to the examples and construction. The technique according to the present disclosure also includes various modifications and variations within an equivalent range. In addition, various combinations and forms, and furthermore, other combinations and forms including only one element, or more, or less than these elements are also within the scope and the range of the present disclosure.

The invention claimed is:

1. A starting system for starting an engine having a crankshaft and a ring gear, the starting system comprising:
  a starting electric motor unit; and
  a rotating electrical machine,
  wherein the starting electric motor unit comprises:
    a starter motor configured to receive a first rotation instruction, from a drive instruction unit, to rotate a pinion gear connected to the starter motor; and
    a pushing member configured to receive a push instruction from the drive instruction unit, to thereby push the pinion gear toward the ring gear of the engine to contact the pinion gear with the ring gear;
  wherein the rotating electrical machine comprises:
    a multi-phase AC motor including a field winding and an armature winding,
  wherein the rotating electrical machine is configured to:
    receive a second rotation instruction from the drive instruction unit; and
    cause a current having a predetermined phase to flow in the armature winding of the multi-phase AC motor and energize the field winding to thereby cause the ring gear to be rotated, in response to receiving the second rotation instruction from the drive instruction unit, during a pre-drive period before drive of the starter motor,
  wherein, during the pre-drive period before drive of the starter motor, in response to receiving the pushing instruction from the drive instruction unit, the pushing member pushes out the pinion gear toward the ring gear so that the pinion engages with the ring gear and a driving force of the starter motor is transmitted to the pinion gear to cause rotation of the ring gear, which thereby causes the crankshaft of the engine to rotate, to thereby start the engine, and
  wherein the rotating electrical machine is configured to receive the second rotation instruction from the drive instruction unit after the pushing member pushes out the pinion gear toward the ring gear.

2. The starting system according to claim 1, wherein the starting electric motor unit includes a connecting mechanism that is connected to the pinion gear, and cuts off power from the ring gear to the starter motor when the ring gear rotates in a predetermined direction based on the rotation of the crankshaft.

3. The starting system according to claim 2, wherein the predetermined direction is a direction in which the ring gear is rotated by the pinion gear.

4. A starting system for starting an engine having a crankshaft and a ring gear, the starting system comprising:
  a starting electric motor unit; and
  a rotating electrical machine,
  wherein the starting electric motor unit comprises:
    a starter motor configured to receive a first rotation instruction, from a drive instruction unit, to rotate a pinion gear connected to the starter motor; and
    a pushing member configured to receive a push instruction from the drive instruction unit, to thereby push the pinion gear toward the ring gear of the engine to contact the pinion gear with the ring gear;
  wherein the rotating electrical machine comprises:
    a multi-phase AC motor including a field winding and an armature winding,
  wherein the rotating electrical machine is configured to:
    receive a second rotation instruction from the drive instruction unit; and
    cause a current having a predetermined phase to flow in an armature winding of the multi-phase AC motor to thereby rotate the ring gear in a first direction, and, after the rotation of the ring gear in the first direction, cause the ring gear to rotate in a second direction opposite to the first direction, in response to receiving the second rotation instruction from the drive instruction unit, during a pre-drive period before drive of the starter motor,
  wherein, in response to receiving the pushing instruction from the drive instruction unit, the pushing member pushes out the pinion gear toward the ring gear so that the pinion engages with the ring gear and a driving force of the starter motor is transmitted to the pinion gear to cause rotation of the ring gear, which thereby causes the crankshaft of the engine to rotate, to thereby start the engine,
  wherein the rotating electrical machine is configured to receive the second rotation instruction from the drive instruction unit after the pushing member pushes out the pinion gear toward the ring gear.

5. A starting device used in a starting system including a starting electric motor unit and a rotating electrical machine, the starting device comprising:
  a drive instruction unit configured to:
    transmit a first rotation instruction to a starter motor, the first rotation instruction instructing the starter motor to rotate a pinion gear connected to the starter motor;
    transmit a push instruction to a pushing member, the push instruction instructing the pushing member to push the pinion gear toward a ring gear of an engine to contact the pinion gear with the ring gear;
    transmit a second rotation instruction to the rotating electrical machine, the rotating electrical machine having a multi-phase AC motor,
    subsequent to the transmitting of the second rotation instruction to the rotating electrical machine, cause a current having a predetermined phase to flow in an armature winding of the multi-phase AC motor and energize a field winding of the multi-phase AC motor to thereby cause the ring gear to be rotated, during a pre-drive period before drive of the starter motor,
wherein the drive instruction unit is configured to transmit the second rotation instruction to the rotating electrical machine after the pushing member pushes out the pinion gear toward the ring gear.

6. The starting device according to claim 5, wherein the drive instruction unit is configured to cause the ring gear to be rotated in a first direction, and further configured to cause the ring gear to rotate in a second direction opposite the first direction for engagement of the ring gear with the pinion gear after rotation of the ring gear in the first direction, during the pre-drive period.

7. The starting device according to claim 5, wherein the drive instruction unit is further configured to cause a current of a phase different from the predetermined phase to flow after causing the current of the predetermined phase to flow during the pre-drive period.

8. The starting device according to claim 5, wherein the starting device further comprises a motor driving unit for driving the starter motor,
wherein the motor driving unit is configured to drive the starter motor to rotate the pinion gear in a same direction as the ring gear, as the ring gear starts to be rotated in the predetermined direction by the drive of the rotating electrical machine.

9. A starting device used in a starting system including a starting electric motor unit and a rotating electrical machine, the starting device comprising:
a drive instruction unit configured to:
transmit a first rotation instruction to a starter motor, the first rotation instruction instructing the starter motor to rotate a pinion gear connected to the starter motor;
transmit a push instruction to a pushing member, the push instruction instructing the pushing member to push the pinion gear toward a ring gear of an engine to contact the pinion gear with the ring gear;
transmit a second rotation instruction to the rotating electrical machine, the rotating electrical machine having a multi-phase AC motor,
subsequent to the transmitting of the second rotation instruction to the rotating electrical machine, cause a current having a predetermined phase to flow in an armature winding of the multi-phase AC motor to thereby rotate the ring gear in a first direction, and, after the rotation of the ring gear in the first direction, cause the ring gear to rotate in a second direction opposite to the first direction, during a pre-drive period before drive of the starter motor,
wherein the drive instruction unit is configured to transmit the rotation instruction to the rotating electrical machine after the pushing member pushes out the pinion gear toward the ring gear.

* * * * *